United States Patent

Matsumoto et al.

[19]

[11] Patent Number: 6,043,617

[45] Date of Patent: Mar. 28, 2000

[54] VARIABLE SPEED DRIVING APPARATUS FOR INDUCTION MACHINES

[75] Inventors: Yasushi Matsumoto; Chiharu Osawa; Tetsuya Mizukami, all of Tokyo, Japan

[73] Assignee: Fuji Electric Co., Ltd., Japan

[21] Appl. No.: 09/037,100

[22] Filed: Mar. 9, 1998

[30] Foreign Application Priority Data

Mar. 7, 1997 [JP] Japan .................................. 9-052602
Jul. 28, 1997 [JP] Japan .................................. 9-201709

[51] Int. Cl.[7] .................................................. B61C 15/08
[52] U.S. Cl. ........................................... 318/52; 180/65.5
[58] Field of Search .............................. 318/52, 66–69, 318/71, 72, 798–811, 34, 727; 180/65.5, 308, 242

[56] References Cited

U.S. PATENT DOCUMENTS

| | | | |
|---|---|---|---|
| 4,335,337 | 6/1982 | Okamatsu et al. | 318/52 |
| 4,780,650 | 10/1988 | Miyazaki et al. | 318/71 |
| 4,825,131 | 4/1989 | Nozaki et al. | 318/52 |
| 5,345,155 | 9/1994 | Masaki et al. | 318/52 |
| 5,661,380 | 8/1997 | Obara et al. | 318/800 |

OTHER PUBLICATIONS

DC 3 kV High Voltage GTO type VVVF Inverter for Rail–Way Cars: by Masahiro Ashiya et al., ;Aug. 27, 1991. 1991 National Convention Record I.E.E. Japan—Industry Applications Society, pp. 47–51, with abstract.

"A Stator Flux Oriented Induction Machine Drive", by Xingyi Xu et al.,, Apr. 1988, Dept. of Electricaland Computer Engineering, I.E.E.E. pp. 870–876.

*Primary Examiner*—Robert E. Nappi
*Assistant Examiner*—Rina I. Duda
*Attorney, Agent, or Firm*—Rossi & Associates

[57] ABSTRACT

A variable speed driving apparatus drives a plurality of induction machines that facilitates reducing the deviations of the primary magnetic fluxes of the induction machines from the reference and preventing the torque and rotating speed of each induction machine from lowering in the low speed range or when the loads on the respective induction machines are unbalanced. The variable speed driving apparatus includes an inverter 1, induction machines 2, current detectors 3, speed detectors 4, a reference angular frequency operating device 6 for operating the rotating angular frequency of the induction machine bearing the heaviest load based on the output signals of the speed detectors 4, a first phase difference operating device $7_1$, for operating the first phase difference between the secondary side component of a reference current and a primary reference magnetic flux, a first reference slip angular frequency operating device $8_1$, to which the first phase difference is inputted, an adder $12_1$, for adding the output of the operating device $8_1$, and the output of the operating device 6, an integrator 13 for integrating the output of the adder $12_1$, a detected current vector rotating device 5 for converting the output of the current detectors 3 to a q-axis component and a d-axis component based on the output of the integrator 13, a q-axis current regulator 10, a d-axis current regulator 11, and a reference voltage vector rotating device $15_1$ for converting the reference d-axis current value and reference q-axis current value to reference three-phase voltage values based on the output of the integrator 13.

42 Claims, 21 Drawing Sheets

VARIABLE SPEED DRIVING APPARATUS FOR INDUCTION MACHINES

FIELD OF THE INVENTION

The present invention relates to a variable speed driving apparatus for driving a plurality of induction machines with an inverter.

BACKGROUND OF THE INVENTION

FIG. 17 is a block diagram of a typical variable speed driving apparatus according to the prior art for driving a plurality of induction machines. As shown in FIG. 17, the conventional variable speed driving apparatus includes an inverter 1, induction machines 2 ($2_1 \ldots 2_N$), current detectors 3 ($3_u$, $3_v$, $3_w$), speed detectors 4 ($4_1 \ldots 4_N$), a detected current vector rotating device 5, a reference angular frequency operating device 6, a reference slip angular frequency operating device 8$_3$, a reference magnetization current operating device 9, amplitude operating devices 30$_1$ and 30$_2$, a proportional plus integral operating device 31, an adder 12$_6$, an integrator 13, a multiplier 14, and a reference voltage vector rotating device 15$_2$.

The operation of the variable speed driving apparatus of FIG. 17 will now be described in detail. The reference magnetization current operating device 9 operates the reference value of a magnetization current $i_M^*$ according to the following equation (1) based on the reference value of a primary magnetic flux $\phi_1^*$ inputted thereto:

$$i_M^* = (N \cdot \phi_1^*)/L_1 \tag{1}$$

where, $L_1$ is the primary inductance per an induction machine and N the number of the induction machines.

The detected current vector rotating device 5 executes the transformation between the three-phase and two-phase systems according to the following equation (2) based on a reference phase value $\theta^*$ and detected current values $i_u$, $i_v$ and $i_w$ detected by the current detectors 3.

$$\begin{vmatrix} i_{1d} \\ i_{1q} \end{vmatrix} = \frac{2}{3} \begin{vmatrix} \cos\theta^* & \cos[\theta^* - (2/3)\pi] & \cos[\theta^* - (4/3)\pi] \\ -\sin\theta^* & -\sin[\theta - (2/3)\pi] & -\sin[\theta^* - (4/3)\pi] \end{vmatrix} \cdot \begin{vmatrix} i_U \\ i_V \\ i_W \end{vmatrix} \tag{2}$$

The amplitude operating device 30$_1$ operates a detected current amplitude I according to the following equation 3. And, the amplitude operating device 30$_2$ operates a reference current amplitude I* according to the following equation 4 based on the reference magnetization current value $i_M^*$ and reference magnetization current value $i_T^*$ inputted thereto.

$$I = \sqrt{(i_{1d}^2 + i_{1q}^2)} \tag{3}$$

$$I^* = \sqrt{(i_M^{*2} + i_T^{*2})} \tag{4}$$

The reference angular frequency operating device 6 outputs, based on the detected speed values $\omega_{r1}$, $\omega_{r2}$, $\omega_{rN}$ detected by the speed detectors $4_1$, $4_2$, $4_N$, the rotor angular frequency of the induction machine, the speed thereof is the lowest, in the motoring mode, and the rotor angular frequency of the induction machine the speed thereof is the fastest in the regenerative mode as a reference angular frequency $\omega_r$.

The slip angular frequency operating device 8$_3$ operates a reference slip angular frequency $\omega_s^*$ according to the following equation 5:

$$\omega_S^* = (R_2 \cdot i_T^*)/(N \cdot \phi_1^*) \tag{5}$$

wherein, $R_2$ is a secondary resistance per an induction machine.

The adder 12$_6$ calculates a reference angular frequency of the inverter (hereinafter referred to as a "primary reference angular frequency") $\omega_1^*$ by adding the result of the proportional plus integral operation of the difference between the reference current amplitude I* and the detected current amplitude I, the reference slip angular frequency $\omega_s^*$ and the reference angular frequency $\omega_R$.

The multiplier 14 calculates a reference voltage amplitude V* by multiplying the primary reference angular frequency $\omega_1^*$ and a primary reference magnetic flux $\phi_1^*$.

The integrator 13 calculates the reference phase value $\theta^*$ by integrating the primary reference angular frequency $\omega_1^*$.

The reference voltage vector rotating device 15$_2$ operates the three-phase reference voltage values $i_u^*$, $i_v^*$ and $i_w^*$ according to the following equation 6 based on the reference voltage amplitude V* and reference phase value $\theta^*$ and outputs the calculated reference voltage values $i_u^*$, $i_v^*$ and $i_w^*$ to the inverter 1.

$$\begin{vmatrix} i_U^* \\ i_V^* \\ i_W^* \end{vmatrix} = V^* \cdot \begin{vmatrix} \sin\theta^* \\ \sin(\theta^* - 2\pi/3) \\ \sin(\theta^* - 4\pi/3) \end{vmatrix} \tag{6}$$

By controlling the variable speed driving apparatus for driving the induction machines as described above, the primary magnetic fluxes of the induction machines bearing respective loads are regulated at a certain value and the current amplitudes at the reference value thereof.

In the conventional system described above, the reference voltage amplitude V* is determined by feeding forward the primary reference angular frequency $\omega_1^*$ and the primary reference magnetic flux $\phi_1^*$. Due to this, the deviation of the actual voltage from the reference voltage amplitude becomes relatively high, since the reference voltage amplitude is small in the low speed region of the induction machines, that is when the primary reference angular frequency $\omega_1^*$ is small. As a result, the desired magnitude of magnetization current is not fed, the deviation of the primary magnetic flux from its reference value increases and the torque and rotating speed of the induction machine bearing a load lower.

In addition, the primary magnetic flux of the induction machine bearing a load is hardly adjusted at its reference value, and the torque and rotating speed of each induction machine cause lowering when certain unbalances exist between the loads of the respective induction machines, since the slip is not controlled in response to the state of load of each induction machine.

In view of the foregoing, it is an object of the present invention to provide a variable speed driving apparatus for driving a plurality of induction machines that facilitates minimizing the deviations of the primary magnetic fluxes of the induction machines bearing respective loads from the primary reference magnetic flux and preventing the torque and the rotating speed of each induction machine from lowering even in the low speed range or when certain unbalances exist between the loads of the respective induction machines.

SUMMARY OF THE INVENTION

According to an aspect of the invention, there is provided a variable speed driving apparatus which includes an inverter; a set of current detectors for outputting detected current values; a plurality of induction machines connected to the inverter; a plurality of speed detectors, each coupled to each of the induction machines; a reference angular frequency operating means for operating the rotating angular frequency of one of the induction machines bearing the heaviest load based on the output signals from the speed detectors; a first phase difference operating means for operating the first phase difference between the secondary side component of a reference current and a primary reference magnetic flux; a first reference slip angular frequency operating means, thereto the first phase difference is inputted; a first adder for adding the output of the first reference slip angular frequency operating means and the output of the reference angular frequency operating means and for outputting a primary reference angular frequency; an integrator for integrating the primary reference angular frequency; a detected current vector rotating means for converting the detected current values to a q-axis component perpendicular to the primary reference magnetic flux and a d-axis component parallel to the primary reference magnetic flux based on the output of the integrator; a d-axis current regulating means, thereto a d-axis component of the reference current value and the d-axis component of the detected current values are inputted; a q-axis current regulating means, thereto a q-axis component of the reference current value and the q-axis component of the detected current values are inputted; and a reference voltage vector rotating means for converting a d-axis reference voltage value and a q-axis reference voltage value to reference three-phase voltage values based on the output of the integrator.

According to another aspect of the invention, there is provided a variable speed driving apparatus which includes an inverter; a set of current detectors for outputting detected current values; a plurality of induction machines connected to the inverter; a plurality of speed detectors, each coupled to each of the induction machines; a reference angular frequency operating means for operating the rotating angular frequency of one of the induction machines bearing the heaviest load based on the output signals from the speed detectors; a second phase difference operating means for operating the second phase difference between the secondary side component of a reference current and a reference induced voltage value; a second reference slip angular frequency operating means, thereto the second phase difference is inputted; a first adder for adding the output of the second reference slip angular frequency operating means and the output of the reference angular frequency operating means and for outputting a primary reference angular frequency; an integrator for integrating the primary reference angular frequency; a detected current vector rotating means for converting the detected current values to a q-axis component perpendicular to the primary reference magnetic flux and a d-axis component parallel to the primary reference magnetic flux based on the output of the integrator; a d-axis current regulating means, thereto a d-axis component of the reference current value and the d-axis component of the detected current values are inputted; a q-axis current regulating means, thereto a q-axis component of the reference current value and the q-axis component of the detected current values are inputted; and a reference voltage vector rotating means for converting a d-axis reference voltage value and a q-axis reference voltage value to reference three-phase voltage values based on the output of the integrator.

Advantageously, the variable speed driving apparatus further includes a first secondary reference reactive current operating means, to which the first phase difference between the secondary side component of the reference current and the primary reference magnetic flux and a reference torque current value are inputted; and a second adder for adding the output of the first secondary reference reactive current operating means and the d-axis reference current value.

Advantageously, the variable speed driving apparatus further includes a second secondary reference reactive current operating means, to which the second phase difference between the secondary side component of the reference current and the reference induced voltage value and a reference torque current value are inputted; and a second adder for adding the output of the second secondary reference reactive current operating means and the d-axis reference current value.

Advantageously, the variable speed driving apparatus according to one aspect of the invention further includes a loaded induction machine number operating means for calculating the number of the induction machines bearing respective loads based on the outputs of the speed detectors and for outputting the calculated number of the induction machines to the first phase difference operating means.

Advantageously, the variable speed driving apparatus according to the other aspect of the invention further includes a loaded induction machine number operating means for calculating the number of the induction machines bearing respective loads based on the outputs of the speed detectors and for outputting the calculated number of the induction machines to the second phase difference operating means.

Advantageously, the variable speed driving apparatus further includes a set of voltage detectors for detecting the alternating voltages of the inverter and for outputting detected voltage values; a voltage vector rotating means for converting the detected voltage values to a d-axis component and a q-axis component; an induced voltage operating means, to which the output of the voltage vector rotating means and the output of the detected current vector rotating means are inputted; a primary magnetic flux regulating means, to which the output of the induced voltage operating means, the primary reference magnetic flux and the primary reference angular frequency are inputted; and a third adder for adding the output of the primary magnetic flux regulating means to the reference d-axis current component.

Advantageously, the variable speed driving apparatus further includes a voltage estimating means, to which the reference three-phase voltage values are inputted, for outputting estimated three-phase voltage values; a voltage vector rotating means for converting the estimated three-phase voltage values to a q-axis component and a d-axis component; an induced voltage operating means, to which the output of the voltage vector rotating means and the output of the detected current vector rotating means are inputted; a primary magnetic flux regulating means, to which the output of the induced voltage operating means, the primary reference magnetic flux and the primary reference angular frequency are inputted; and a third adder for adding the output of the primary magnetic flux regulating means to the reference d-axis current component.

Advantageously, the variable speed driving apparatus further includes a second voltage estimating means, to which the reference d-axis voltage value and the reference q-axis voltage value are inputted, for outputting estimated two-phase voltage values; an induced voltage operating means, to which the output of the detected current vector rotating means and the estimated two-phase voltage values are inputted; a primary magnetic flux regulating means, to which the output of the induced voltage operating means, the primary reference magnetic flux and the primary reference angular frequency are inputted; and a third adder for adding the output of the primary magnetic flux regulating means to the reference d-axis current component.

Advantageously, the variable speed driving apparatus further includes a set of voltage detectors for detecting the alternating voltages of the inverter and for outputting detected voltage values; a voltage vector rotating means for converting the detected voltage values to a d-axis component and a q-axis component; an induced voltage operating means, to which the output of the voltage vector rotating means and the output of the detected current vector rotating means are inputted; and an angular frequency compensation operating means for operating the compensation value of the primary reference angular frequency corresponding to a d-axis voltage component of an induced voltage.

Advantageously, the variable speed driving apparatus further includes a first voltage estimating means, to which the reference three-phase voltage values are inputted, for outputting estimated three-phase voltage values; a voltage vector rotating means for converting the estimated three-phase voltage values to a q-axis component and a d-axis component; an induced voltage operating means, to which the output of the voltage vector rotating means and the output of the detected current vector rotating means are inputted; and an angular frequency compensation operating means for operating the compensation value of the primary reference angular frequency corresponding to a d-axis voltage component of an induced voltage.

Advantageously, the variable speed driving apparatus further includes a second voltage estimating means, to which the reference d-axis voltage value and the reference q-axis voltage value are inputted, for outputting estimated two-phase voltage values; an induced voltage operating means, to which the output of the detected current vector rotating means and the estimated two-phase voltage values are inputted; and an angular frequency compensation operating means for operating the compensation value of the primary reference angular frequency corresponding to a d-axis voltage component of an induced voltage.

Advantageously, the variable speed driving apparatus further includes a loaded induction machine number operating means for calculating the number of the induction machines bearing respective loads based on the outputs of the speed detectors and for outputting the calculated number of the induction machines to the induced voltage operating means.

Advantageously, the variable speed driving apparatus further includes a q-axis current regulating means which includes a proportional plus integral operating device, the integral term of which is inputted to the induced voltage operating means.

BRIEF DESCRIPTION OF THE DRAWING FIGURES

DETAILED DESCRIPTION OF THE PREFERRED EMBODIMENTS

The variable speed driving apparatus of the invention prevents, in driving a plurality of induction machines, the torque and rotating speeds of the induction machines bearing respective loads from lowering by regulating the primary magnetic fluxes of the induction machines bearing respective loads at the reference primary magnetic flux.

The variable speed driving apparatus of the invention reduces the deviations between the directions of the primary magnetic flux vectors of the induction machines bearing respective loads and the direction of the primary reference magnetic flux vector by feed forward compensation considering that the angular frequency of the electric power to be fed from the inverter is the sum of the rotating angular frequency of the heavily loaded induction machine and the slip angular frequency corresponding to the direction of the secondary current vector.

At first, the operation for obtaining the primary angular frequency with reference to the rotating speed of the heavily loaded induction machine will be explained.

The relation expressed by the following equation 7 holds for the induction machine fed with the electric power of the primary angular frequency $\omega_1$ from the inverter. In equation 7, $\omega_2$ is a rotating angular frequency of the induction machine converted to the electric angle, $\omega_s$ is a slip angular frequency and $\omega s$ is slip.

$$\omega_2 = \omega_1 - \omega_S = (1-s) \cdot \omega_1 \tag{7}$$

Therefore, the slip angular frequency $\omega_s$ is expressed by the following equation 9 when the reference primary angular frequency $\omega_1^*$ is given by the following equation 8.

$$\omega_1^* = \omega_R + \omega_S^* \tag{8}$$

$$\omega_S = \omega_1 - \omega_2 \approx \omega_1^* - \omega_2 = \omega_S^* + (\omega_R - \omega_2) \tag{9}$$

Here, $_R$ is the reference angular frequency, that is the rotating angular frequency of the heavily loaded induction machine, and $_s^*$ is the reference slip angular frequency.

Generally, the rotating speed of the induction machine bearing the heaviest load (the most heavily loaded induction machine) is the slowest in the motoring mode and the fastest in the regenerative mode. Therefore, the slip of the most heavily loaded induction machine may be regulated at the reference value and the slip of the lightly loaded induction machine may be minimized by giving the primary angular frequency with reference to the rotating speed of the most heavily loaded induction machine.

Then, the relations between the direction of the secondary current vector and the slip angular frequency to $\omega_s$ will be described and the reference slip angular frequency to $\omega_s^*$ will be derived.

Figure 18:
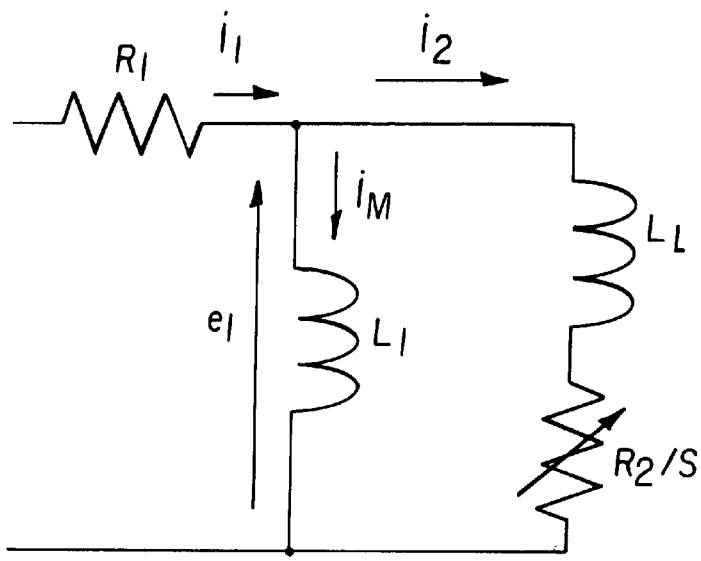
FIG. 18 is an L-type equivalent circuit of an induction machine.

FIG. 18 is an L-type equivalent circuit of an induction machine. In FIG. 18, $R_1$ designates primary resistance, $R_2$ secondary resistance, $L_1$ primary inductance, $L_L$ secondary leakage inductance, s slip, $i_1$ a primary current, $i_2$ a secondary current, $i_M$ a magnetization current, and $e_1$ an induced voltage.

Referring now to FIG. 18, the relation described by the following equation 10 exists between the induced voltage $e_1$ and the secondary current $i_2$.

$$e_1 = [(R_2/s) + j\omega_1 L_L] \cdot i_2 \tag{10}$$

Figure 19:
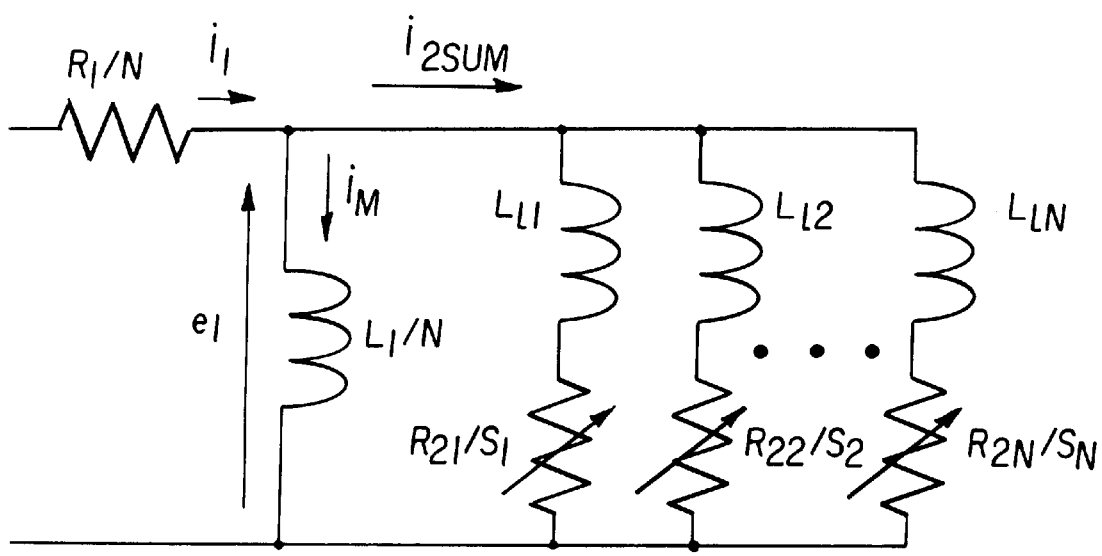
FIG. 19 is an approximated equivalent circuit of a plurality of induction machines connected in parallel.

Since the equivalent circuit of two or more (a plurality N of) induction machines connected in parallel is approximated by FIG. 19, the sum $i_{2SUM}$ of the secondary currents of the induction machines is expressed by the following equation 11.

$$i_{2SUM} = \sum_{k=1}^{N} i_{2k} \tag{11}$$

$$= \sum_{k=1}^{N} (s_k \cdot e_1)/(R_{2k} + j\omega_1 L_{Lk} s_k)$$

$$= \sum_{k=1}^{N} (s_k \cdot e_1)/(R_{2k} + j\omega s_k L_{Lk})$$

$$(\omega s_k = \omega_1 \cdot s_k)$$

Figure 20:
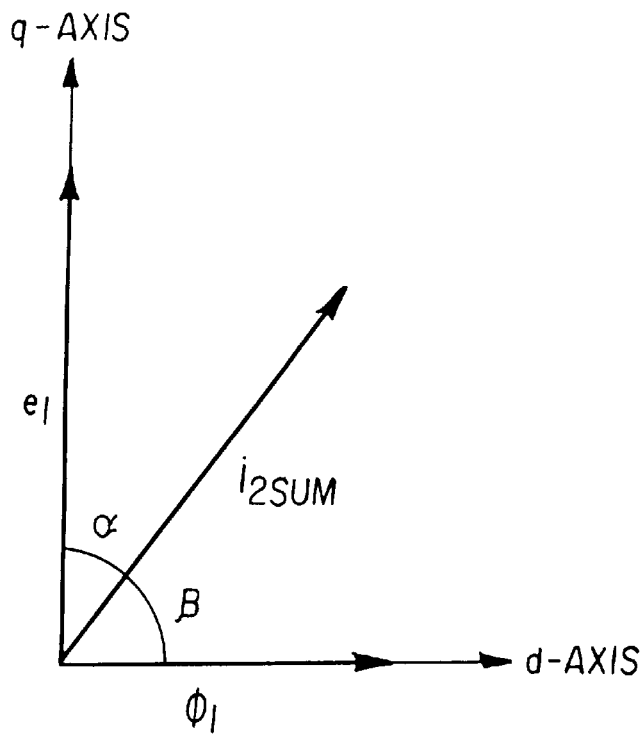
FIG. 20 is a vector diagram for explaining the function of the present invention.

As shown in FIG. 20, the phase difference between the sum $i_{2SUM}$ of the secondary currents of a plurality of induction machines and the induced voltage $e_1$ is put to be. The vector diagram of FIG. 20 is described with reference to the primary magnetic flux.

The phase difference is easily derived from equation 11 and expressed by the following equation 12

$$\alpha = arg\left[\sum_{k=1}^{N} 1/(R_{2k} + j\omega s_k L_{Lk})\right] \tag{12}$$

Since the phase difference between the induced voltage $e_1$ and the primary magnetic flux$_1$ is always 90 degrees of angle, the phase difference between the sum $i_{2SUM}$ of the secondary currents of a plurality of induction machines and the primary magnetic flux$_1$ is expressed by the following equation 13.

$$\beta = 90° - \alpha \tag{13}$$

$$= 90° - arg\left[\sum_{k=1}^{N} 1/(R_{2k} + j\omega s_k L_{Lk})\right]$$

When an induction motor is connected, the relation between the phase differences $\alpha_1$, $\beta_1$, and the slip angular frequency $\omega s$ is expressed by the following equation 14.

$$\omega s = (R_2/L_L) \cdot \tan\alpha_1 = (R_2/L_L)\tan(90° - \beta_1) \tag{14}$$

Therefore, if one assumes that there exist almost no differences between the secondary resistance values $R_2$'s and between the secondary leakage inductance values $L_L$'s, the relation between the phase differences $\alpha$, $\beta$ and the slip angular frequency $\omega$ for a plurality of induction machines is approximated by the following equation 15.

$$\omega s \approx (N \cdot R_2/M \cdot L_L) \cdot \tan\alpha \tag{15}$$

$$= (R_2/L_L) \cdot \tan\alpha$$

$$= (R_2/L_L) \cdot \tan(90° - \beta)$$

where N is the number of induction machines.

Figure 21:
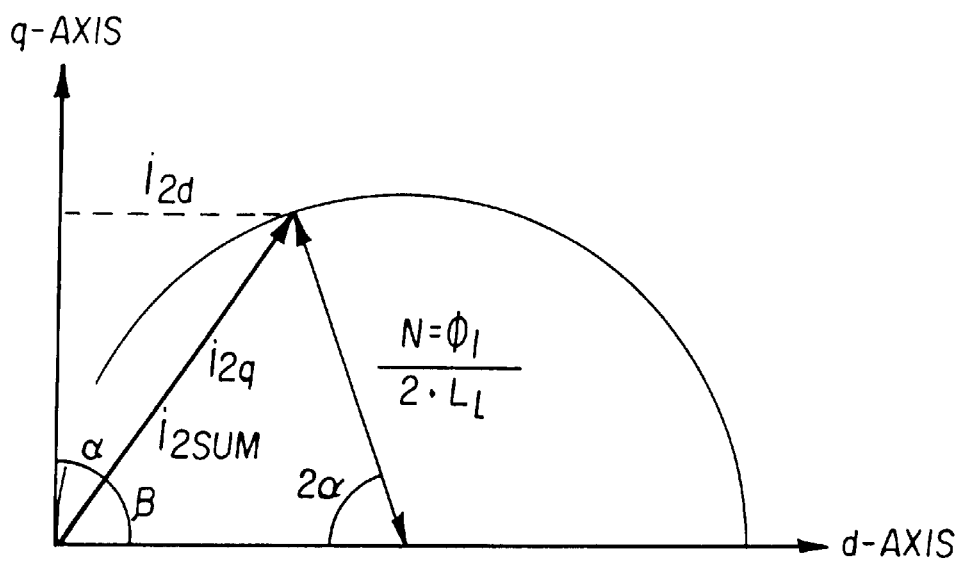
FIG. 21 is another vector diagram for explaining the function of the present invention.

The trace of the sum of the secondary current vectors of a plurality of induction machines drawn using the slip as a parameter is a semicircle with a diameter of $(N\phi_1)/L_L$ as shown in FIG. 21. Therefore, the phase difference is derived from FIG. 21 and expressed by the following equation 16. In equation 16, $i_{2q}$ is a q-axis component of the secondary current, that is a torque current.

$$\alpha = (1/2)\sin^{-1}[(2 \cdot L_L \cdot i_{2q})/(N \cdot \phi_1)] \quad (16)$$

Since the secondary current and the slip angular frequency ωs are related with each other by equations 15 and 16, the reference slip angular frequency ωs* can be set by the feed forward of the primary reference magnetic flux $\phi_1$* and the reference torque current value $i_T$* as expressed by the following equation 17.

$$\omega_s^* = (R_2/L_L) \cdot \tan\{(1/2)\sin^{-1}[(2 \cdot L_L \cdot i_T^*)/(N \cdot \phi_1^*)]\} \quad (17)$$

Therefore, the deviations between the direction of the reference primary magnetic flux vector and the directions of the primary magnetic flux vectors of the induction machines bearing respective loads are reduced by expressing the primary reference magnetic flux $\omega_1$* by the following equation 18 and by regulating the actual values of the q-axis current and d-axis current to coincide with the respective reference values.

$$\omega_1^* = \omega_R + (R_2/L_L) \cdot \tan\{(1/2)\sin^{-1}[(2 \cdot L_L \cdot i_T^*)/(N \cdot \phi_1^*)]\} \quad (18)$$

The variable speed driving apparatus of the invention reduces the deviations between the magnitudes of the primary magnetic fluxes of the induction machines bearing respective loads and the magnitude of the reference primary magnetic flux by feed forward compensation considering that the reactive current to be fed from the inverter consists of the sum of the magnetization current and the reactive component of the secondary current.

Figure 22:
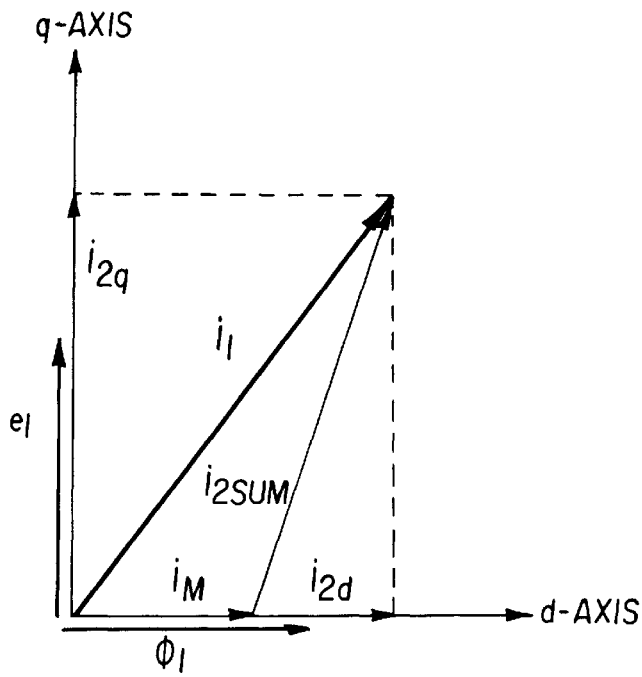
FIG. 22 is still another vector diagram for explaining the function of the present invention.

The vectors of the currents $i_{2SUM}$, $i_M$, induced voltage $_1$ and primary magnetic flux $\phi_1$ of FIG. 19 are described in FIG. 22 with reference to the primary magnetic flux. The q-axis component (effective component) of the primary current consists of a sum of the torque currents $i_T$ (sum of the effective components of the secondary currents $i_{2q}$). The d-axis component (ineffective component) of the primary current consists of a sum of the magnetization currents $i_M$ and the ineffective components of the secondary currents $i_{2d}$. Therefore, if one uses the reference d-axis current value $i_{1d}$* for the reference magnetization current value $i_M$*, the magnitude of the primary magnetic flux will not be regulated at the reference value, since deficit of the magnetization current is caused due to the ineffective component thereof which flows to the secondary side. To regulate the primary magnetic flux at its reference value, it is effective to add the value corresponding to the ineffective component of the secondary current to the reference d-axis current value $i_{2d}$ in advance.

The relation between the effective component $i_{2q}$ and ineffective component $i_{2d}$ of the secondary current is expressed by the following equation 19 derived from the description of FIG. 21. Therefore, the compensation value of the reference d-axis current value $i_{1d}$* is calculated by feeding forward the reference primary magnetic flux $\phi_1$* and the reference torque current value $i_T$*.

$$i_{2d} = i_{2q} \cdot \tan\{(1/2)\sin^{-1}[(2 \cdot L_L \cdot i_{2q})/(N \cdot \phi_1)]\} \quad (19)$$

-continued $$= i_{2q} \cdot \tan \alpha$$

Thus, deficit of the magnetization current is prevented from causing and the deviations of the magnitudes of the primary magnetic fluxes of the induction machine bearing respective loads from its reference value are reduced by putting the reference d-axis current value $i_{1d}$* as expressed by the following equation 20.

$$i_{1d}^* = i_M^* + i_T^* \cdot \tan\{(1/2)\sin^{-1}[(2 \cdot L_L \cdot i_T^*)/(N \cdot \phi_1^*)]\} \quad (20)$$

The variable speed driving apparatus of the invention reduces the deviations of the directions and the magnitudes of the primary magnetic flux vectors of the induction machines bearing respective loads from the direction and the magnitude of the reference primary magnetic flux vector when some induction machines are bearing extremely light loads by feed forward compensation considering that the secondary side impedance of the induction machine bearing an extremely light load may be deemed to be infinity.

Figure 23:
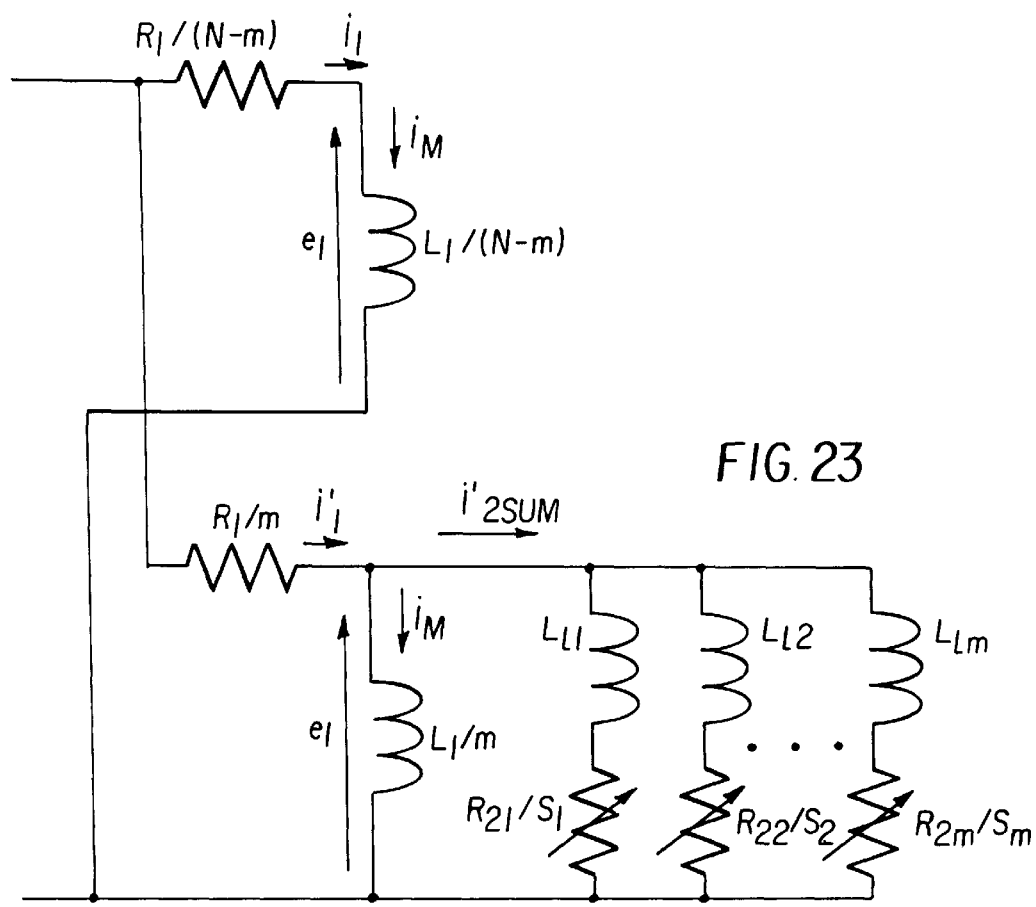
FIG. 23 is an equivalent circuit when some of all the induction machines are bearing respective loads.
Figure 24:
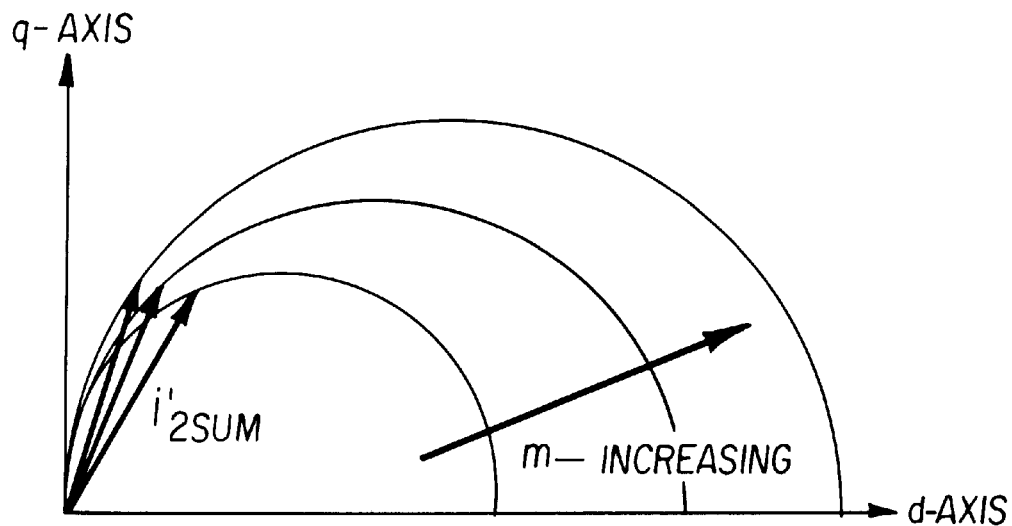
FIG. 24 is a further vector diagram for explaining the function of the present invention.

The equivalent circuit when m of N induction machines (mN) are bearing respective loads is described in FIG. 23. The trace of the sum of the secondary currents $i_{2SUM}$' of the induction machines bearing respective loads changes with the number m of the induction machines bearing respective loads when the trace is described using the slip as a parameter as shown in FIG. 24. Therefore, it is effective to adjust the slip, corresponding to the number m of the induction machines bearing respective loads, to reduce the deviations of the directions of the primary magnetic flux vectors of the induction machines bearing respective loads from the direction of the reference primary magnetic flux vector. Since the slip angular frequency $_s$ and the effective component of the secondary current $i_{2q}$ are related by the following equation 21, the deviations of the directions of the primary magnetic flux vectors of the induction machines bearing respective loads from the direction of the reference primary magnetic flux vector are reduced by putting the reference primary angular frequency $\omega_1$* as the one expressed by the following equation 22.

$$\omega_S = (R_2/L_L) \cdot \tan\{(1/2)\sin^{-1}[(2 \cdot L_L \cdot i_{2q})/(m \cdot \phi_1)]\} \quad (21)$$

$$\omega_1^* = \omega_R + (R_2/L_L) \cdot \tan\{(1/2)\sin^{-1}[(2 \cdot L_L \cdot i_T^*)/(m \cdot \phi_1^*)]\} \quad (22)$$

To make the magnitudes of the primary magnetic flux of the induction machines bearing respective loads coincide with the reference value, it is effective to add the sum of the ineffective components of the secondary currents of the induction machines bearing respective loads to the reference d-axis current value $i_{1d}$* in advance. Since the sum of the effective components and the sum of the effective components of the secondary currents of the induction machines bearing respective loads are related with each other by the following equation 23, the deviations of the magnitudes of the primary magnetic fluxes of the induction machines bearing respective loads from the magnitude of the reference primary magnetic flux are reduced by putting the reference d-axis current component $i_{1d}$* as the one expressed by the following equation 24.

$$i_{2d} = i_{2q} \cdot \tan\{(1/2)\sin^{-1}[(2 \cdot L_L \cdot i_{2q})/(m \cdot \phi_1)]\} \quad (23)$$

$$i_{1d}^* = i_M^* + i_T^* \cdot \tan\{(1/2)\sin^{-1}[(2 \cdot L_L \cdot i_T^*)/(m \cdot \phi_1^*)]\} \quad (24)$$

The variable speed driving apparatus of the invention reduces the deviations of the magnitudes of the primary magnetic fluxes of the induction machines bearing respective loads from the magnitude of the reference primary magnetic flux by feedback control considering that the deviation of the magnitude of the primary magnetic flux of the induction machine bearing a load from the magnitude of the reference primary magnetic flux is proportional to the deviation of the actual value of the induced voltage from the reference value.

The primary magnetic flux $\phi_1$, output voltage of the inverter $v_1$, induced voltage $e_1$, primary current $i_1$ and primary angular frequency $\omega_1$ are related with one another by the following equations 25, 26 and 27. In equations 25, 26 and 27, the suffixes d and q designate the d-axis component and q-axis component, respectively.

$$|\phi_1| = \sqrt{(\phi_{1d2} + \phi_{1d2})} \quad (25)$$

$$\phi_{1d} = (e_{1q}/\omega_1) = \{v_{1q} - [(R_1/N) \cdot i_{1q}]\}/\omega_1 \quad (26)$$

$$\phi_{1q} = (e_{1d}/\omega_1) = \{v_{1d} - [(R_1/N) \cdot i_{1d}]\}/\omega_1 \quad (27)$$

The two-phase voltages and currents are converted from the three-phase voltages and currents by the foregoing equation 2 and the following equation 28.

$$\begin{vmatrix} v_{1d} \\ v_{1q} \end{vmatrix} = \frac{2}{3} \begin{vmatrix} \cos\theta^* & \cos[\theta^* - (2/3)\pi] & \cos[\theta^* - (4/3)\pi] \\ -\sin\theta^* & -\sin[\theta^* - (2/3)\pi] & -\sin[\theta^* - (4/3)\pi] \end{vmatrix} \cdot \begin{vmatrix} VU \\ VV \\ VW \end{vmatrix} \quad (28)$$

Therefore, the magnitude of the primary magnetic flux may be made coincide with the reference value by obtaining the primary magnetic flux by equations 2, 25, 26, 27 and 28 and by adding the result of proportional plus integral operation expressed by the following equation 29 or 30 to the reference d-axis current value $i_{id}^*$.

$$\Delta i_M = K_P \cdot [1 + (1/sT_i)] \cdot (\phi_1^* - |\phi_1|) \quad (29)$$

$$\Delta i_M = K_P' \cdot [1 + (1/sT_i)] \cdot (\phi_1^* - |\phi_1|) \cdot \omega_1^* \quad (30)$$

$$= K_P' \cdot [1 + (1/sT_i)] \cdot (\omega_1^* \phi_1^* - |e_1|)$$

$$= K_P' \cdot [1 + (1/sT_i)] \cdot \left[\omega_1^* \phi_1^* - \sqrt{(e_{1d}^2 + e_{1d}^2)}\right]$$

Here, s is a Laplacean, $K_p$ and $K_p'$ proportional gains and $T_i$ an integral time.

Since the q-axis component of the primary magnetic flux $\phi_{1q}$ is almost zero, the same effects are obtained by adding the result of the proportional plus integral operation expressed by the following equation 31 in place of equation 29 or the result of the proportional plus integral operation expressed by the following equation 32 in place of equation 30 to the reference d-axis current value $i_{1d}^*$.

$$\Delta i_M = K_P \cdot [1 + (1/sT_i)] \cdot (\phi_1^* - \phi_{1d}) \quad (31)$$

$$= K_P \cdot [1 + (1/sT_i)] \cdot [\phi_1^* - (e_{1q}/\omega_1^*)]$$

$$\Delta i_M = K_P' \cdot [1 + (1/sT_i)] \cdot (\phi_1^* - \phi_{1d}) \cdot \omega_1^* \quad (32)$$

$$= K_P' \cdot [1 + (1/sT_i)] \cdot (\omega_1^* \phi_1 - e_{1q})$$

The variable speed driving apparatus of the invention reduces the deviations of the directions of the primary magnetic flux vectors of the induction machines bearing respective loads from the direction of the reference primary magnetic flux vector by feedback control considering that the d-axis component of the induced voltage, which is to be zero, does not converges to zero when the direction of the primary magnetic flux vector of the induction machine deviates from the direction of the reference primary magnetic flux vector.

Figure 25:
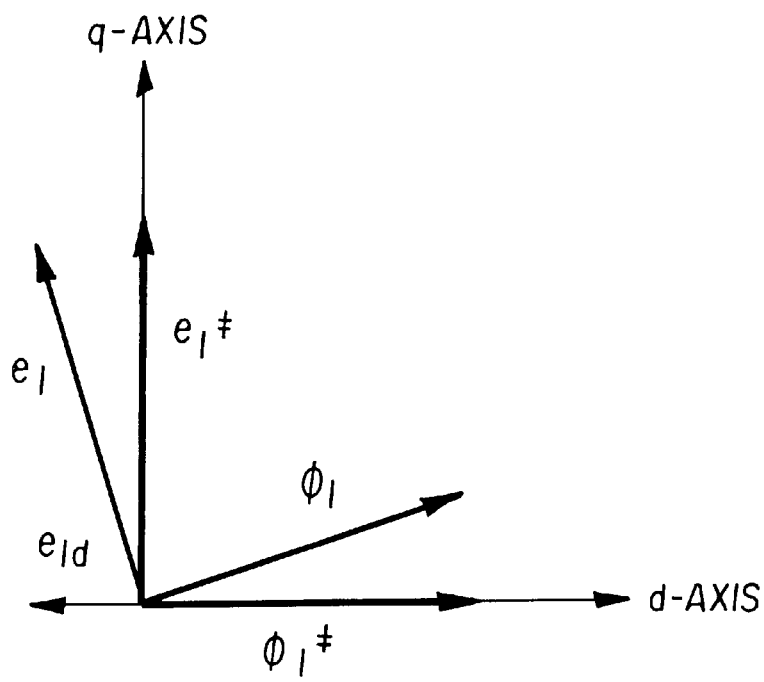
FIG. 25 is a still further vector diagram for explaining the function of the present invention.

The vector diagram of the primary magnetic flux and the induced voltage when the direction of the primary magnetic flux vector $e_1$ deviates from the direction of the reference primary magnetic flux vector $e_1^*$ is shown in FIG. 25. As clearly described in FIG. 25, the d-axis component of the induced voltage $e_{1d}$ does not converges to zero. Therefore, the reference primary angular frequency $\omega_1^*$ is corrected, for example, by using the compensation value $\Delta\omega_1^*$ described by the following equation 33, corresponding to the d-axis component $e_{1d}$ of the induced voltage so that the d-axis component $e_{1d}$ of the induced voltage may be approximated to be zero. As a result, the deviations of the directions of the primary magnetic flux vectors from the direction of the reference primary magnetic flux vector are reduced.

$$\Delta\omega_1^* = -K \cdot e_{1d} \quad (33)$$

$$= -K \cdot [v_{1d} - (R_1/N) \cdot i_{1d}]$$

The variable speed driving apparatus of the invention improves the accuracy of operating the induced voltages of the induction machines bearing respective loads when some induction machines are bearing extremely light loads considering that the secondary side impedance in the equivalent circuit of the lightly loaded induction machine may be deemed to be infinity.

The equivalent circuit when m of N induction machines (mN) are bearing respective loads is described in FIG. 23. Therefore, q-axis component $e_{1q}$ of the induced voltage of the induction machine bearing a load is expressed by the following equation 34.

$$e_{1q} = v_{1q} - (R_1/m)i_{1q} \quad (34)$$

Therefore, by detecting the number m of the induction machines bearing respective loads, the operation accuracy of the induced voltage is improved.

The variable speed driving apparatus of the invention improves the accuracy of operating the induced voltages of the induction machines, the loads thereof become extremely light, considering that the integral term of the proportional plus integral operation in the current regulating means corresponds to the voltage drop on the primary side.

By putting the reference q-axis voltage $v_{1q}^*$ to be the sum of the feed forward component of the induced voltage and the result of the proportional plus integral operation of the error of the q-axis current as expressed by the following equation 35, the q-axis component of the induced voltage may be approximated by the following equation 36.

$$v_{1q}^* = \omega_1^* \cdot \phi_1^* + K_q \cdot [1 + (1/sT_q)] \cdot [i_{1q}^* - i_{1q}] \quad (35)$$

$$e_{1q} \approx v_{1q} - K_q \cdot [1 + (1/sT_q)] \cdot [i_{1q}^* - i_{1q}] \quad (36)$$

Therefore, the accuracy of operating the induced voltage of the induction machine is improved by calculating the q-axis component of the induced voltage $e_{1q}$ by equation 36.

With the above as background, specific embodiments of the invention will now be discussed.

Figure 1:
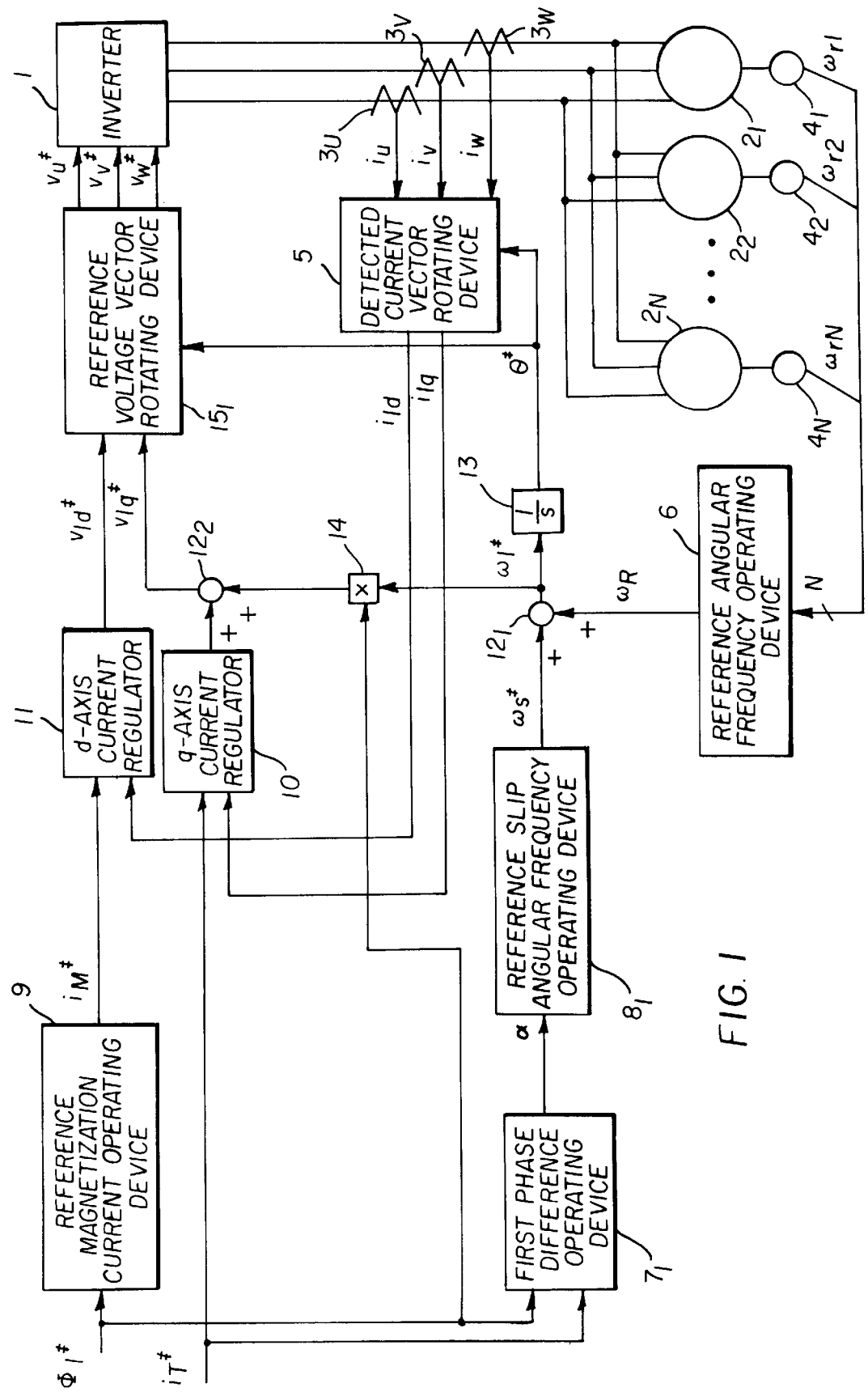
FIG. 1 is a block diagram of a first embodiment of a variable speed driving apparatus for driving a plurality of induction machines according to the present invention.

FIG. 1 is a block diagram of a first embodiment of a variable speed driving apparatus for driving a plurality of induction machines according to the present invention.

Referring now to FIG. 1, the variable speed driving apparatus includes an inverter 1, induction machines $2^1$ $2_N$, current detectors 3 ($3_U$, $3_v$, $3_w$), speed detectors 4 ($4_1$ $4_N$), a detected current vector rotating device 5, a reference angular frequency operating device 6, a first phase difference operating device $7_1$ for operating the first phase difference between the secondary side component of a reference current and a primary reference magnetic flux, a first reference slip angular frequency operating device $8_1$, a reference magnetization current operating device 9, a q-axis current regulator 10, a d-axis current regulator 11, adders $12_1$ and $12_2$, an integrator 13, a multiplier 14, and a reference voltage vector rotating device $15_1$.

Since the inverter 1, induction machines $2_1$ $2_N$, current detectors 3, speed detectors $4_1$ $4_N$, detected current vector rotating device 5, reference angular frequency operating device 6 and multiplier 14 work in the same manner as those of the conventional variable speed driving apparatus, their duplicated explanations will be omitted.

The first phase difference operating device $7_1$ operates a first phase difference according to the following equation 37 based on a reference primary torque current value $i_T^*$ and a reference primary magnetic flux $\phi_1^*$ inputted thereto.

$$\alpha = (1/2)\sin^{-1}[(2 \cdot L_L \cdot i_T^*)/(N \cdot \phi_1^*)] \quad (37)$$

The reference slip angular frequency operating device $8_1$ operates a reference slip angular frequency $\omega_s^*$ according to equations 15 and 17 based on the first phase difference inputted thereto.

The q-axis current regulator 10, to which the reference torque current value $i_T^*$ and a q-axis current $i_{1q}$ are inputted, regulates the q-axis current $i_{1q}$ so that the q-axis current $i_{1q}$ may coincide with the reference torque current value $i_T^*$.

The d-axis current regulator 11, to which a reference magnetization current value $i_M^*$ and a d-axis current $i_{1d}$ are inputted, regulates the d-axis current $i_{1d}$ so that the d-axis current $i_{1d}$ may coincide with the reference magnetization current value $i_M^*$.

The adder $12_1$ calculates a primary reference angular frequency $\omega_1^*$ by adding a reference slip angular frequency $\omega_s^*$ and a reference angular frequency $\omega_R$ according to equation 18. The adder $12_2$ calculates a reference q-axis voltage value $v_{1q}^*$ by adding the output of the multiplier 14 and the output of the q-axis current regulator 10.

The reference voltage vector rotating device $15_1$ operates reference three-phase voltage values $v_U^*$, $v_v^*$ and $v_w^*$ according to the following equation 38 which relates the reference q-axis voltage value $v_{1q}^*$, reference d-axis voltage value $v_{1d}^*$ and reference phase angle $\theta^*$ and feeds the reference three-phase voltage values $v_U^*$, $v_v^*$ and $v_w^*$ to the inverter 1.

$$\begin{vmatrix} VU^* \\ VV^* \\ VW^* \end{vmatrix} = \frac{3}{2} \cdot \begin{vmatrix} \cos\theta^* & -\sin\theta^* \\ \cos[\theta^* - (2/3)\pi] & -\sin[\theta^* - (2/3)\pi] \\ \cos[\theta^* - (4/3)\pi] & -\sin[\theta^* - (4/3)\pi] \end{vmatrix} \cdot \begin{vmatrix} v_{1d}^* \\ v_{1q}^* \end{vmatrix} \quad (38)$$

Thus, the variable speed driving apparatus of FIG. 1 reduces the deviations of the directions of the primary magnetic flux vectors of the induction machines bearing respective loads from the direction of the reference primary magnetic flux vector.

Figure 2:
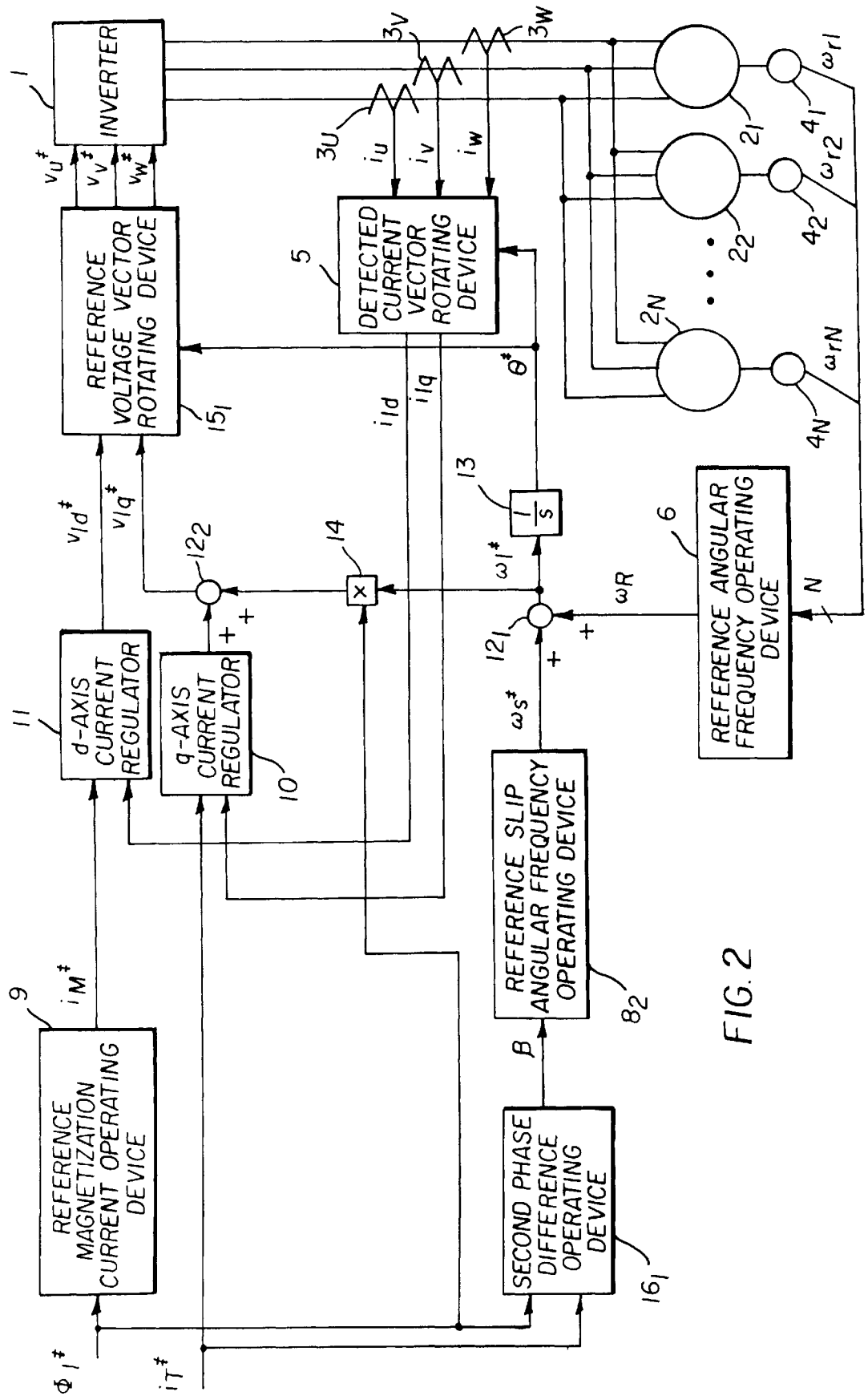
FIG. 2 is a block diagram of a second embodiment of a variable speed driving apparatus for driving a plurality of induction machines according to the present invention.

FIG. 2 is a block diagram of a second embodiment of a variable speed driving apparatus for driving a plurality of induction machines according to the present invention.

Referring now to FIG. 2, the variable speed driving apparatus includes a second phase difference operating device $16_1$ for operating the second phase difference between the secondary side component of a reference current and a reference induced voltage value in place of the first phase difference operating device $7_1$; and a second reference slip angular frequency operating device $8_2$ in place of the first reference slip angular frequency operating device $8_1$.

Now the operations of the devices of FIG. 2 different from those of FIG. 1 will be explained.

The second phase difference operating device $16_1$, to which a reference torque current value $i_T^*$ and a reference primary magnetic flux $\phi_1^*$ are inputted, operates a second phase difference β according to the following equation 39.

$$\beta = 90° = (1/2)\sin^{-1}[(2 \cdot L_L \cdot i_T^*)/(N \cdot \phi_1^*)] \quad (39)$$

The second reference slip angular frequency operating device $8_2$ operates a reference slip angular frequency $\omega_s^*$ according to equations 15 and 17 based on the first phase difference β inputted thereto.

Thus, the variable speed driving apparatus of FIG. 2 reduces the deviations of the directions of the primary magnetic flux vectors of the induction machines bearing respective loads from the direction of the reference primary magnetic flux vector.

Figure 3:
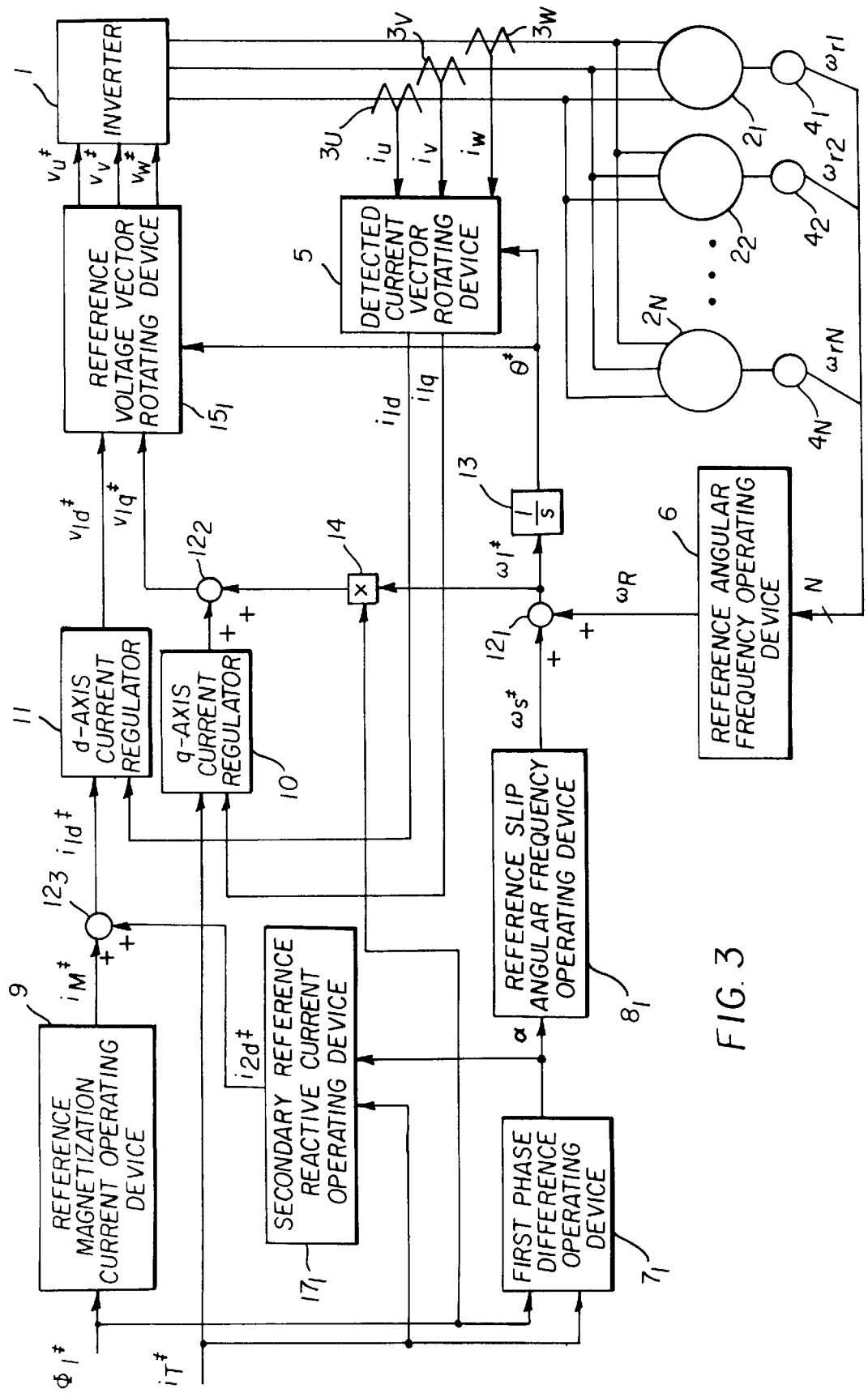
FIG. 3 is a block diagram of a third embodiment of a variable speed driving apparatus for driving a plurality of induction machines according to the present invention.

FIG. 3 is a block diagram of a third embodiment of a variable speed driving apparatus for driving a plurality of induction machines according to the present invention.

The variable speed driving apparatus of FIG. 3 further includes a first secondary reference reactive current operating device $17_1$ and an adder $12_3$ in addition to the constituent elements of the variable speed driving apparatus of FIG. 1.

Now the operations of the devices of FIG. 3 which are not described in FIG. 1 will be explained.

The first secondary reference reactive current operating device $17_1$ to which the reference torque current value $i_T^*$ and the first phase difference α are inputted, operates a secondary reference reactive current value $i_{2d}^*$ according to the following equation 40.

$$i_{2d}^* = i_T^* \cdot \tan \alpha \quad (40)$$

The adder $12_3$ adds the reference magnetization current value $i_M^*$, and the secondary reference reactive current value $i_{2d}^*$ and operates the reference d-axis current value $i_{1d}^*$ by equation 20.

Thus, the driving apparatus of FIG. 3 prevents the magnetization current from deficit and reduces the deviations of the magnitudes of the primary magnetic fluxes of the induction machines bearing respective loads from the magnitude of the reference primary magnetic flux.

Figure 4:
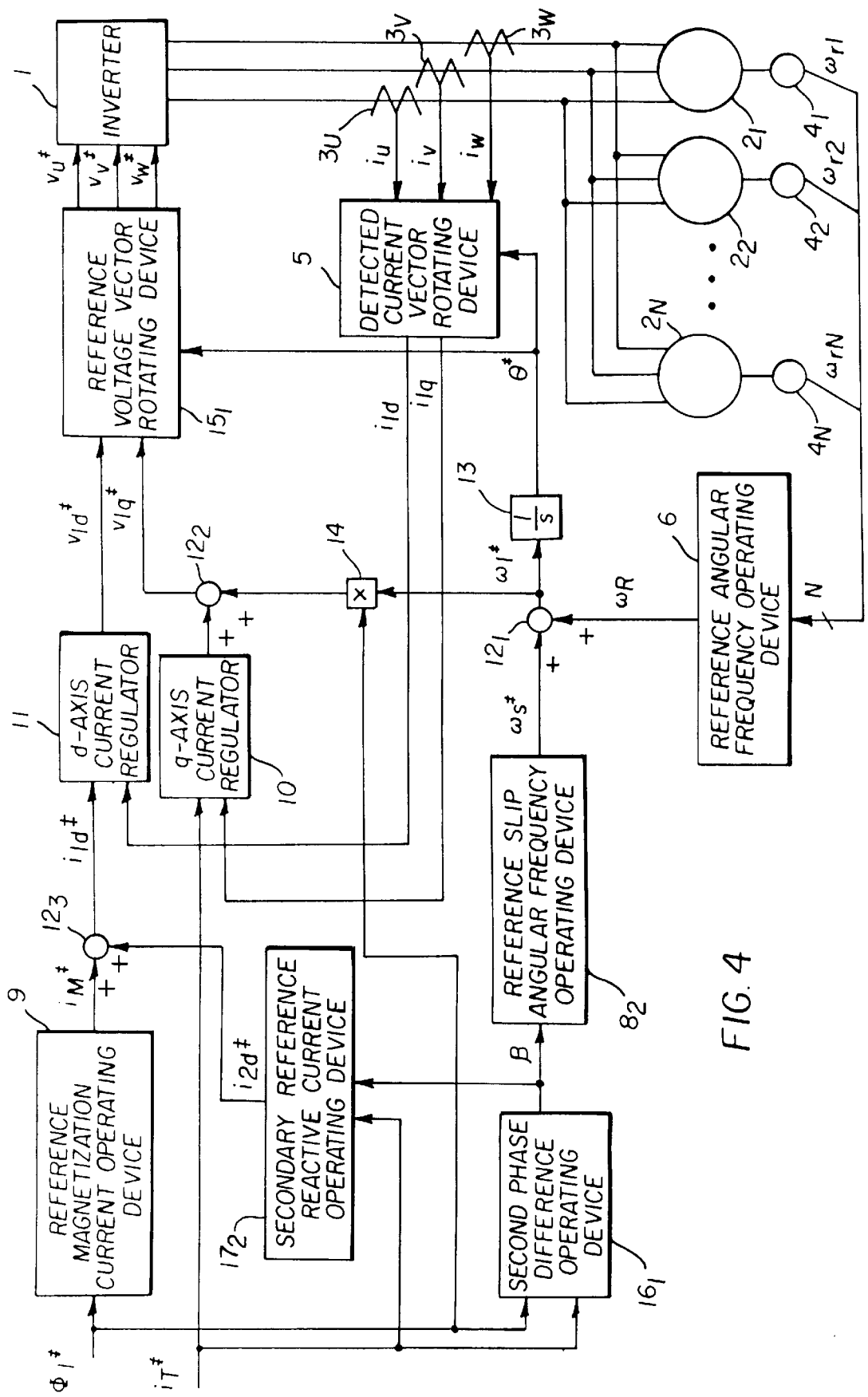
FIG. 4 is a block diagram of a fourth embodiment of a variable speed driving apparatus for driving a plurality of induction machines according to the present invention.

FIG. 4 is a block diagram of a fourth embodiment of a variable speed driving apparatus for driving a plurality of induction machines according to the present invention.

The variable speed driving apparatus of FIG. 4 further includes a second secondary reference reactive current operating device $17_2$ and an adder $12_3$ in addition to the constituent elements of the variable speed driving apparatus of FIG. 2.

Now the operations of the devices of FIG. 4 which are not described in FIG. 2 will be explained.

The second secondary reference reactive current operating device $17_2$, to which the reference torque current value $i_T^*$ and the second phase difference $\beta$ are inputted, operates a secondary reference reactive current value $i_{2d}^*$ according to the following equation 41.

$$i_{2d}^* = i_T^* \cdot \tan(90° - \beta) \tag{41}$$

The adder $12_3$ adds the reference magnetization current value $i_M^*$, and the secondary reference reactive current value $i_{2d}^*$ and operates the reference d-axis current value $i_{1d}^*$ by equation 20.

Thus, the variable speed driving apparatus of FIG. 4 prevents the magnetization currents from deficit and reduces the deviations of the magnitude of the primary magnetic fluxes of the induction machines bearing respective loads from the magnitude of the reference primary magnetic flux.

Figure 5:
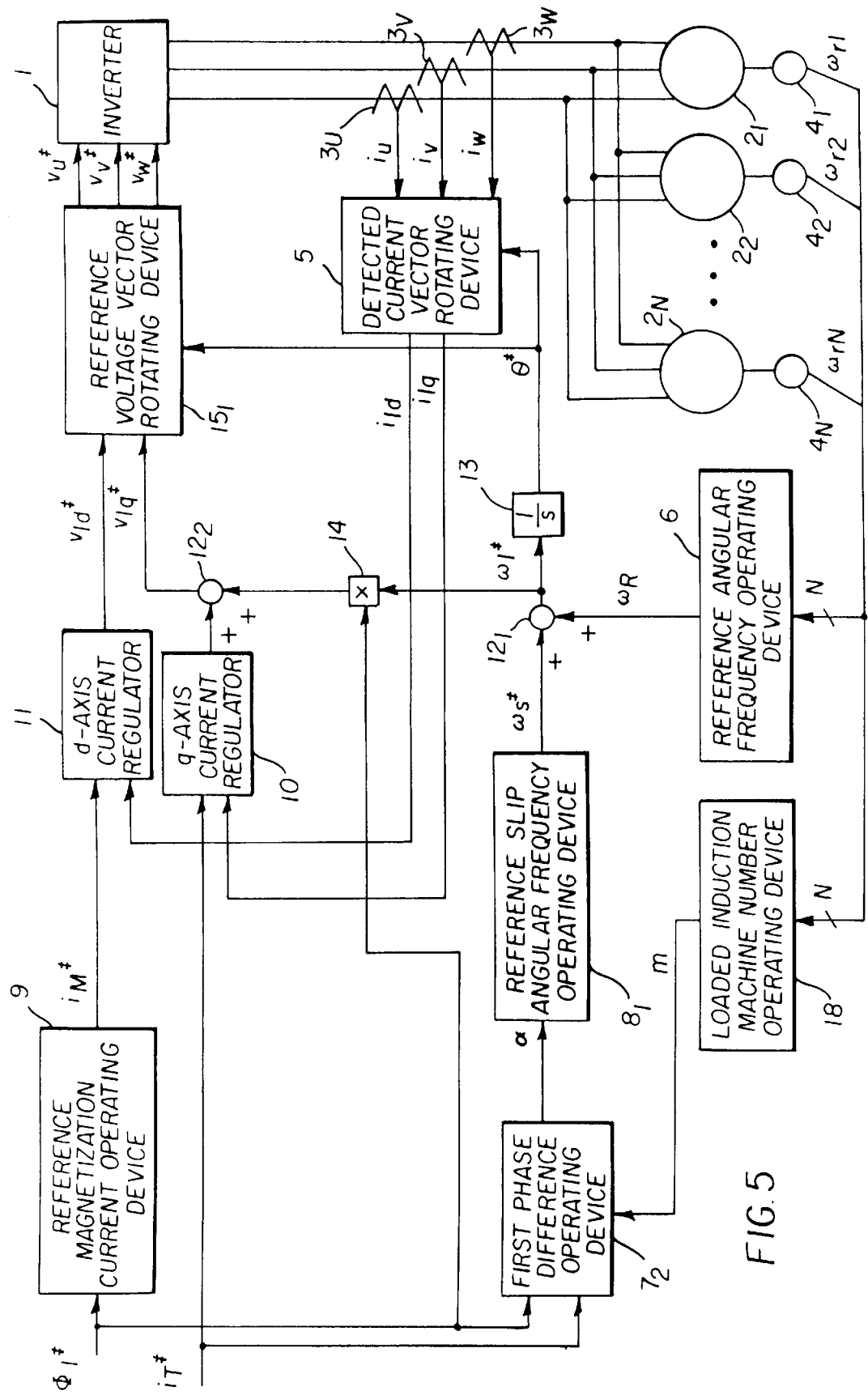
FIG. 5 is a block diagram of a fifth embodiment of a variable speed driving apparatus for driving a plurality of induction machines according to the present invention.

FIG. 5 is a block diagram of a fifth embodiment of a variable speed driving apparatus for driving a plurality of induction machines according to the present invention.

The variable speed driving apparatus of FIG. 5 further includes, in addition to the constituent elements of the variable speed driving apparatus of FIG. 1, a loaded induction machine number operating device 18 for calculating the number m of the induction machines bearing respective loads and feeds the output, i.e. the number m, to the first phase difference operating device $7_2$.

The loaded induction machine number operating device 18, to which detected speed values $\omega_{r1}, \omega_{r2}, \omega_{rN}$ are fed from the respective speed detectors $4_1, 4_2, 4_N$, operates the number m of the induction machines within a certain speed range from the slowest speed in the motoring mode and the number m of the induction machines within a certain speed range from the fastest speed in the regenerative mode.

The first phase difference operating device $7_2$, to which the reference torque current value $i_T^*$, reference primary magnetic flux $\phi_1^*$ and the number m of the loaded induction machines are inputted, operates the first phase difference by substituting m into equation 37 for N, which is the total number of induction machines. The primary reference angular frequency $\omega_1^*$ is obtained from equation 22 using the output $\omega_s^*$ of the reference slip angular frequency operating device $8_1$, to which the first phase difference $\alpha$ is inputted, and $\omega_R$.

Thus, the variable speed driving apparatus of FIG. 5 reduces the deviations of the directions of the primary magnetic flux vectors of the induction machines bearing respective loads from the direction of the reference primary magnetic flux vector even when some induction machines are bearing extremely light loads.

Figure 6:
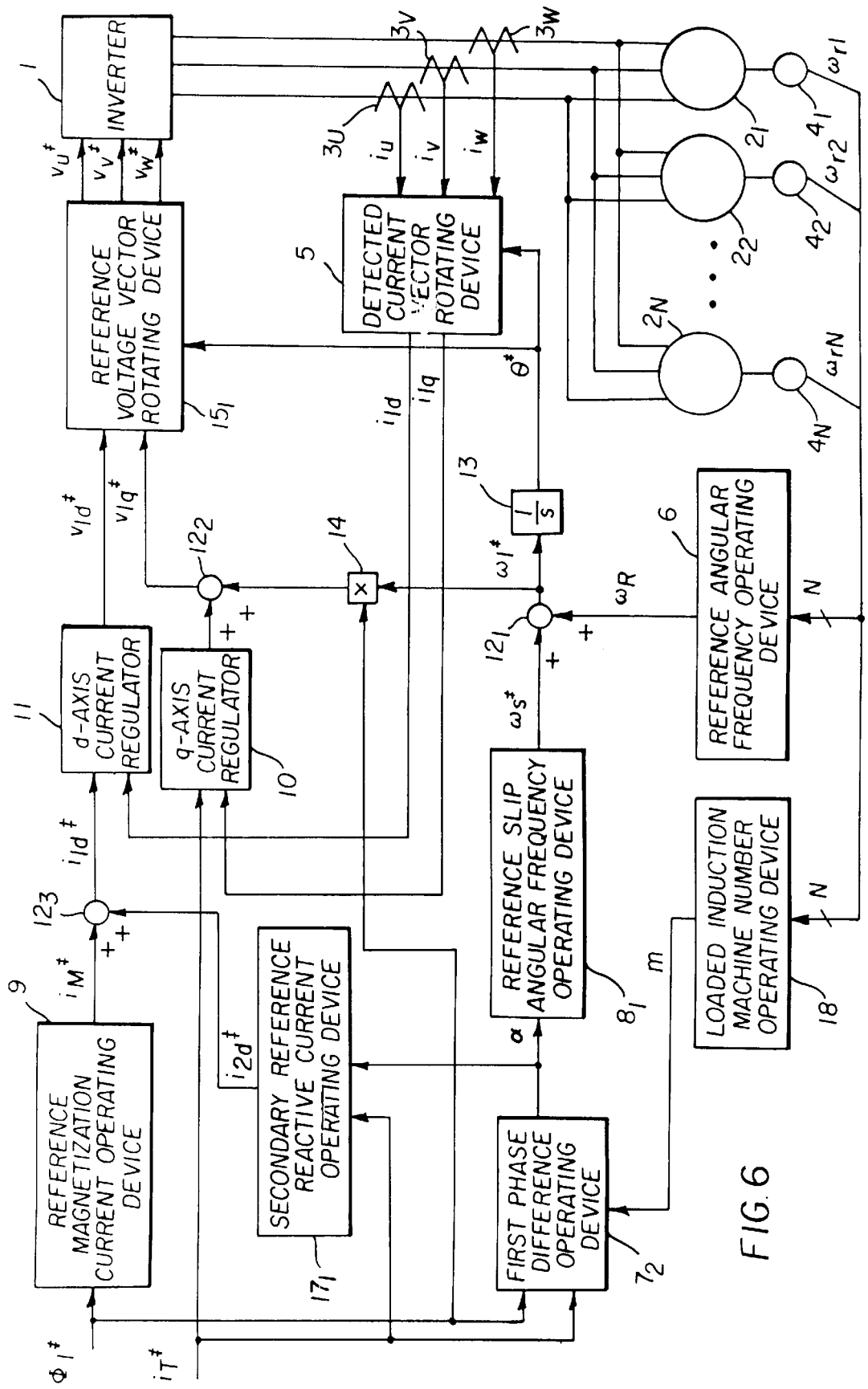
FIG. 6 is a block diagram of a sixth embodiment of a variable speed driving apparatus for driving a plurality of induction machines according to the present invention.

FIG. 6 is a block diagram of a sixth embodiment of a variable speed driving apparatus for driving a plurality of induction machines according to the present invention.

The variable speed driving apparatus of FIG. 6 further includes, in addition to the constituent elements of the variable speed driving apparatus of FIG. 3, a loaded induction machine number operating device 18 for calculating the number m of the induction machines bearing respective loads and feeds the output the number m to the first phase difference operating device $7_2$. The first phase difference outputted from the first phase difference operating means $7_2$ and the reference torque current value $i_T^*$ are inputted to the first secondary reference reactive current operating device $17_1$. The variable speed driving apparatus of FIG. 6 obtains the reference d-axis current value $i_{1d}$ from equation 24 using the output $i_{2d}^*$ of the first secondary reference reactive current operating device $17_1$ and the reference magnetization current value $i_M^*$.

Thus, the variable speed driving apparatus of FIG. 6 prevents the magnetization currents of the induction machines bearing respective loads from deficit and reduces the deviations of the magnitudes of the primary magnetic fluxes of the induction machines bearing respective loads from the magnitude of the reference primary magnetic flux even when some induction machines are bearing extremely light loads.

Figure 7:
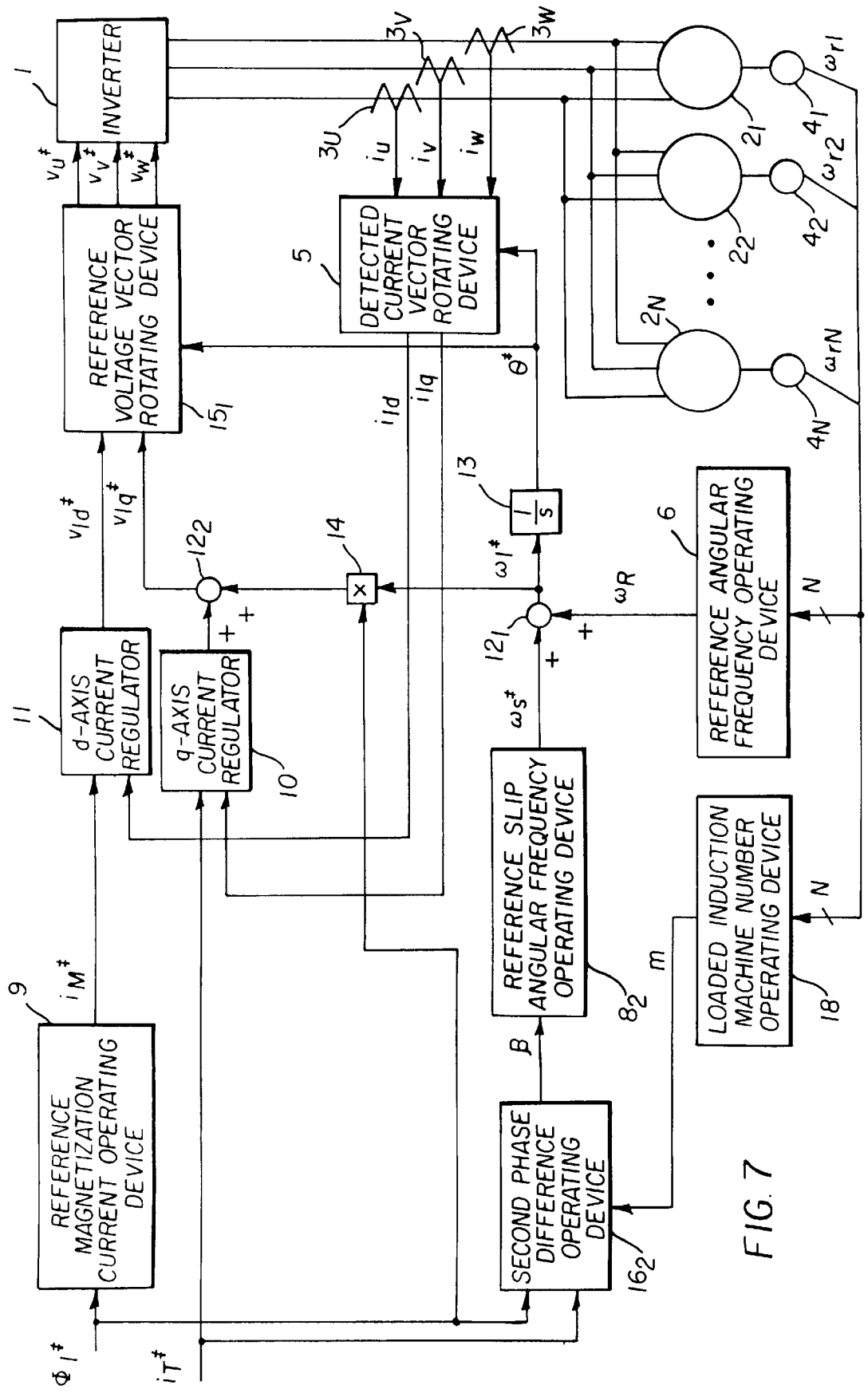
FIG. 7 is a block diagram of a seventh embodiment of a variable speed driving apparatus for driving a plurality of induction machines according to the present invention.

FIG. 7 is a block diagram of a seventh embodiment of a variable speed driving apparatus for driving a plurality of induction machines according to the present invention.

The variable speed driving apparatus of FIG. 7 further includes, in addition to the constituent elements of the variable speed driving apparatus of FIG. 2, a loaded induction machine number operating device 18 for calculating the number m of the induction machines bearing respective loads and feeds the number m to the second phase difference operating device $16_2$. The variable speed driving apparatus of FIG. 7 obtains the primary reference angular frequency $\omega_1^*$ from equation 22.

Thus, the variable speed driving apparatus of FIG. 7 reduces the deviations of the directions of the primary magnetic fluxes of the induction machines bearing respective loads from the direction of the reference primary magnetic flux even when some induction machines are bearing extremely light loads.

Figure 8:
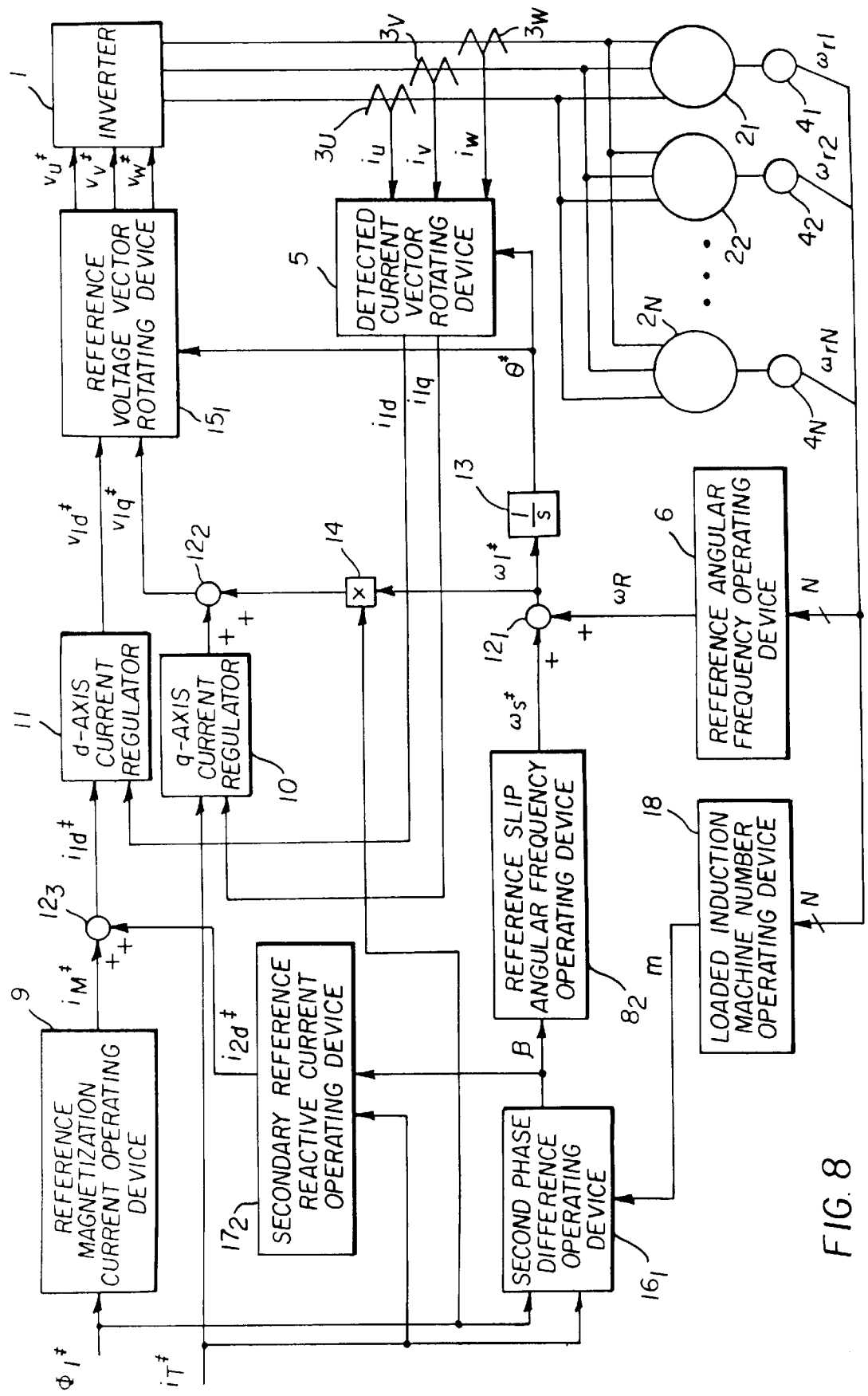
FIG. 8 is a block diagram of an eighth embodiment of a variable speed driving apparatus for driving a plurality of induction machines according to the present invention.

FIG. 8 is a block diagram of an eighth embodiment of a variable speed driving apparatus for driving a plurality of induction machines according to the present invention.

The variable speed driving apparatus of FIG. 8 further includes, in addition to the constituent elements of FIG. 4, a loaded induction machine number operating device 18 for calculating the number m of the induction machines bearing respective loads and feeds the number m to the second phase difference operating device $16_2$. The variable speed driving apparatus of FIG. 8 obtains the reference d-axis current value $i_{1d}$ from equation 24.

Thus, the variable speed driving apparatus of FIG. 8 prevents the magnetization currents of the induction machines bearing respective loads from deficit and reduces the deviations of the magnitudes of the primary magnetic fluxes of the induction machines bearing respective loads from the magnitude of the reference primary magnetic flux even when some induction machines are bearing extremely light loads.

Figure 9:
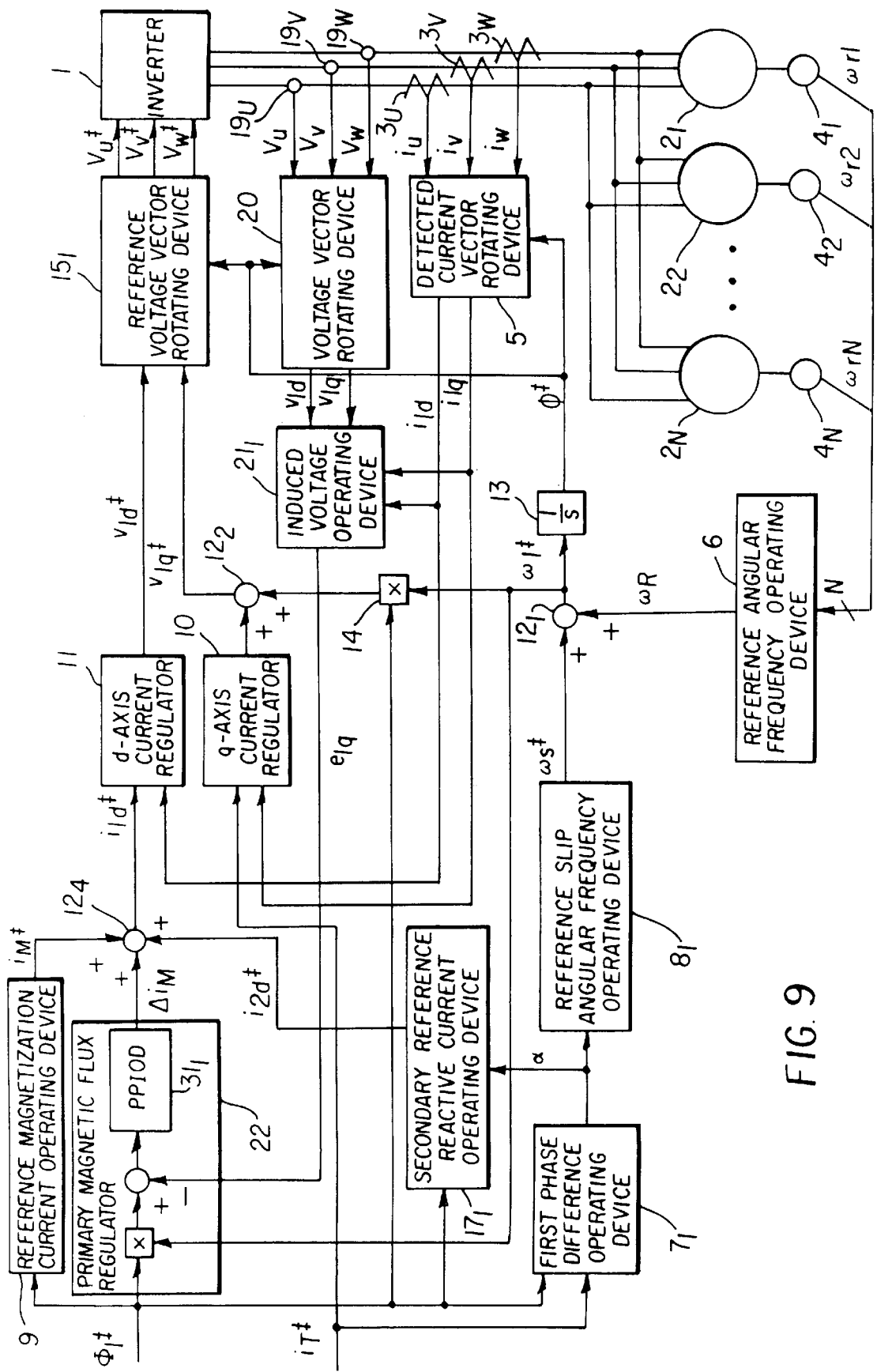
FIG. 9 is a block diagram of a ninth embodiment of a variable speed driving apparatus for driving a plurality of induction machines according to the present invention.

FIG. 9 is a block diagram of a ninth embodiment of a variable speed driving apparatus for driving a plurality of induction machines according to the present invention.

The variable speed driving apparatus of FIG. 9 further includes, in addition to the constituent elements of the variable speed driving apparatus of FIG. 3, voltage detectors 19, a voltage vector rotating device 20, an induced voltage operating device $21_1$ and a primary magnetic flux regulator 22.

The voltage vector rotating device 20 converts the three-phase system to the two-phase system according to equation 28 which relates the reference phase value θ* and the detected voltage values $v_U$, $v_v$, $v_w$ detected by the voltage detectors 19.

The induced voltage operating device $21_1$ operates the q-axis component $e_{1q}$ of the induced voltage according to the following equation 42.

$$e_{1q} = v_{1q} - (R_1/N) \cdot i_{1q} \qquad (42)$$

The primary reference magnetic flux $\phi_1^*$ the primary reference angular frequency $\omega_1^*$ and the q-axis component $e_{1q}$ of the induced voltage $e_{1q}$ are inputted to the primary magnetic flux regulator 22. The primary magnetic flux regulator 22 includes a proportional plus integral operating device $31_1$ and operates the compensation value $\Delta i_M$ for the magnetization current according to equation 31 or 32.

The adder $12_4$ calculates the reference d-axis current value $i_{1d}$ by adding the reference magnetization current value $i_M^*$, secondary reference reactive current value $i_{2d}^*$ and the compensation value $\Delta i_M$ for the magnetization current.

Thus, the variable speed driving apparatus of FIG. 9 facilitates feeding the magnetization current to the induction machines bearing respective loads without causing any excess nor deficit and reducing the deviations of the magnitudes of the primary magnetic fluxes from the magnitude of the primary reference magnetic flux.

The voltage detectors 19, the voltage vector rotating device 20, the induced voltage operating device $21_1$ and the primary magnetic flux regulator 22 can be added to either one of the configurations of FIGS. 1 through 6.

Figure 10:
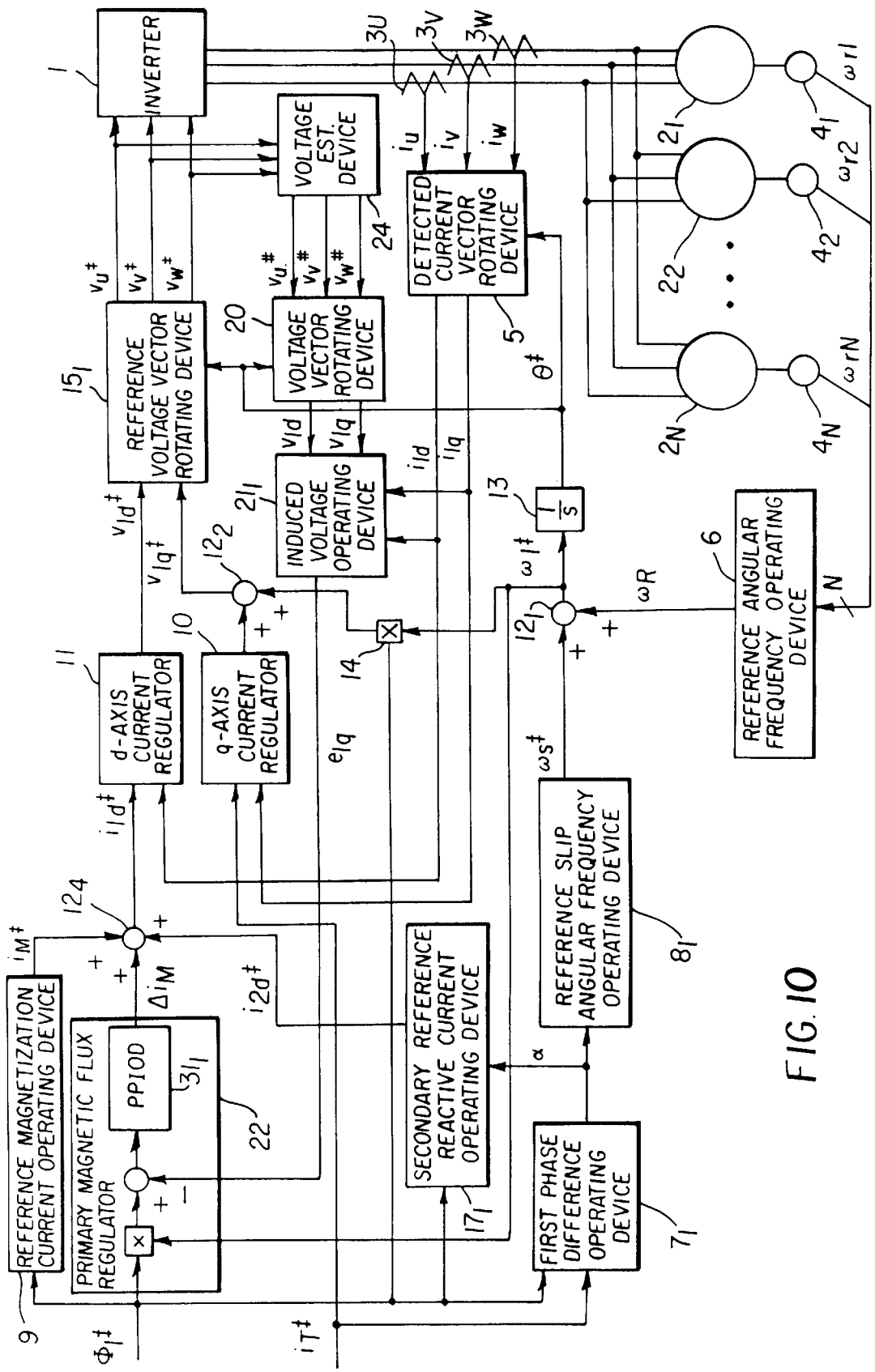
FIG. 10 is a block diagram of a tenth embodiment of a variable speed driving apparatus for driving a plurality of induction machines according to the present invention.

FIG. 10 is a block diagram of a tenth embodiment of a variable speed driving apparatus for driving a plurality of induction machines according to the present invention.

The variable speed driving apparatus of FIG. 10 includes a voltage estimating device 24 in substitution for the voltage detectors 19 of FIG. 9. The reference three-phase voltage values $v_U^*$, $v_v^*$ and $v_w^*$ are inputted to the voltage estimating device 24.

The voltage estimating device 24 estimates estimated three-phase voltage values $v_U\#$, $v_v\#$ and $v_w\#$ from the reference three-phase voltage values $v_U^*$, $v_v^*$ and $v_w^*$. The other operations are same with those of the variable speed driving apparatus of FIG. 9.

Thus, the variable speed driving apparatus of FIG. 10 facilitates feeding the magnetization current to the induction machines bearing respective loads without causing any excess nor deficit and reducing the deviations of the magnitudes of the primary magnetic fluxes from the magnitude of the primary reference magnetic flux.

The voltage estimating device 24 can be combined with either one of the configurations of FIGS. 1 through 6.

Figure 11:
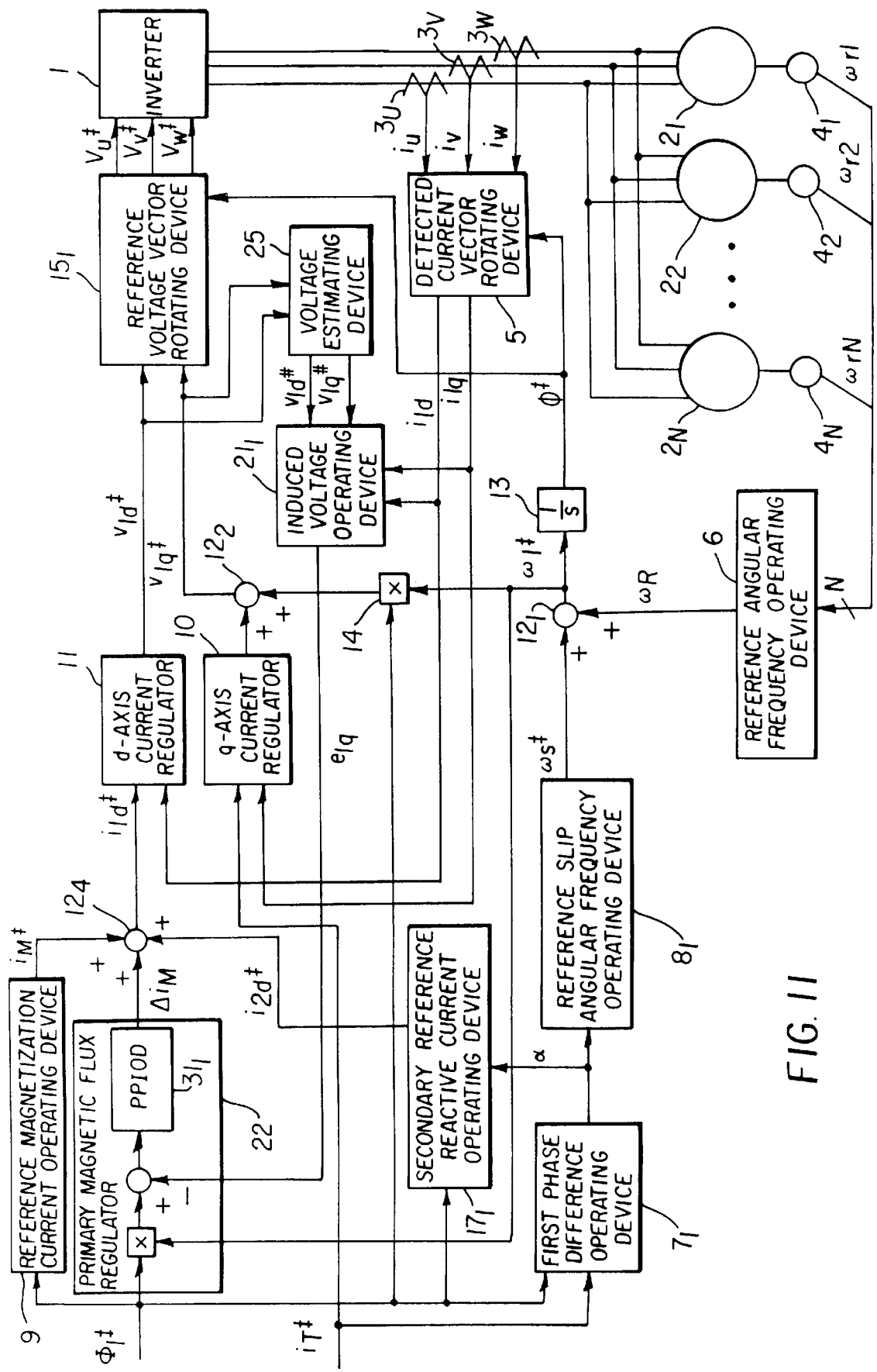
FIG. 11 is a block diagram of an eleventh embodiment of a variable speed driving apparatus for driving a plurality of induction machines according to the present invention.

FIG. 11 is a block diagram of an eleventh embodiment of a variable speed driving apparatus for driving a plurality of induction machines according to the present invention.

The variable speed driving apparatus of FIG. 11 includes a voltage estimating device 25, to which reference two-phase voltage values $V_{1d}^*$ and $v_{1q}^*$ are inputted, in substitution for the voltage vector rotating device 20 of FIG. 9. The output of the voltage estimating device 25 is inputted to an induced voltage operating device $21_1$. The other operations are same with those of the variable speed driving apparatus of FIG. 9.

The voltage estimating device 25 estimates estimated two-phase voltage values $v_{1d}\#$ and $v_{1q}\#$ from the reference two-phase voltage values $v_{1d}^*$ and $v_{1q}^*$.

Thus, the variable speed driving apparatus of FIG. 11 facilitates feeding the magnetization current to the induction machines bearing respective loads without causing any excess nor deficit and reducing the deviations of the magnitudes of the primary magnetic fluxes from the magnitude of the primary reference magnetic flux.

The voltage estimating device 25 can be combined with either one of the configurations of FIGS. 1 through 6.

Figure 12:
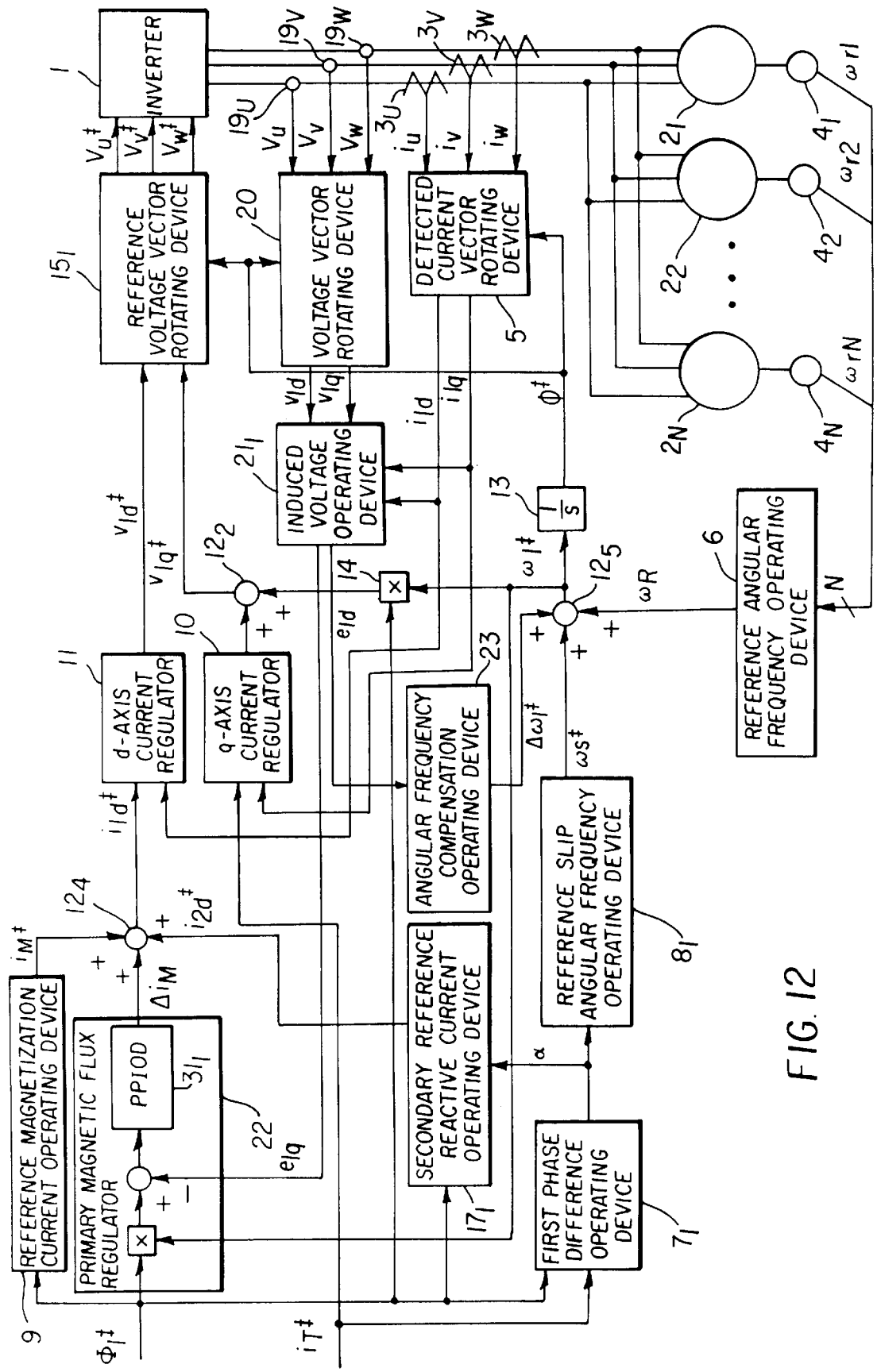
FIG. 12 is a block diagram of a twelfth embodiment of a variable speed driving apparatus for driving a plurality of induction machines according to the present invention.

FIG. 12 is a block diagram of a twelfth embodiment of a variable speed driving apparatus for driving a plurality of induction machines according to the present invention.

The variable speed driving apparatus of FIG. 12 includes an angular frequency compensation operating device 23 in addition to the constituent elements of the variable speed driving apparatus of FIG. 9. The result of the operation in the angular frequency compensation operating device 23 is added to the primary reference angular frequency $\omega_1^*$ in an adder $12_5$.

The angular frequency compensation operating device 23 operates the compensation value of the reference angular frequency $\Delta\omega_1^*$ according to equation 33 using the inputted d-axis component of the induced voltage $e_{1d}$ operated in the induced voltage operating device $21_1$ according to the following equation 43.

$$e_{1d} = v_{1d} - (R_1/N) \cdot i_{1d} \qquad (42)$$

Thus, the variable speed driving apparatus of FIG. 12 facilitates converging the d-axis component of the induced voltage $e_{1d}$ to zero and, as a result, reducing the deviations of the directions of the primary magnetic flux vectors from the direction of the primary reference magnetic flux vector.

The angular frequency compensation operating device 23 can be added to either one of the configurations of FIGS. 1 through 6.

Figure 13:
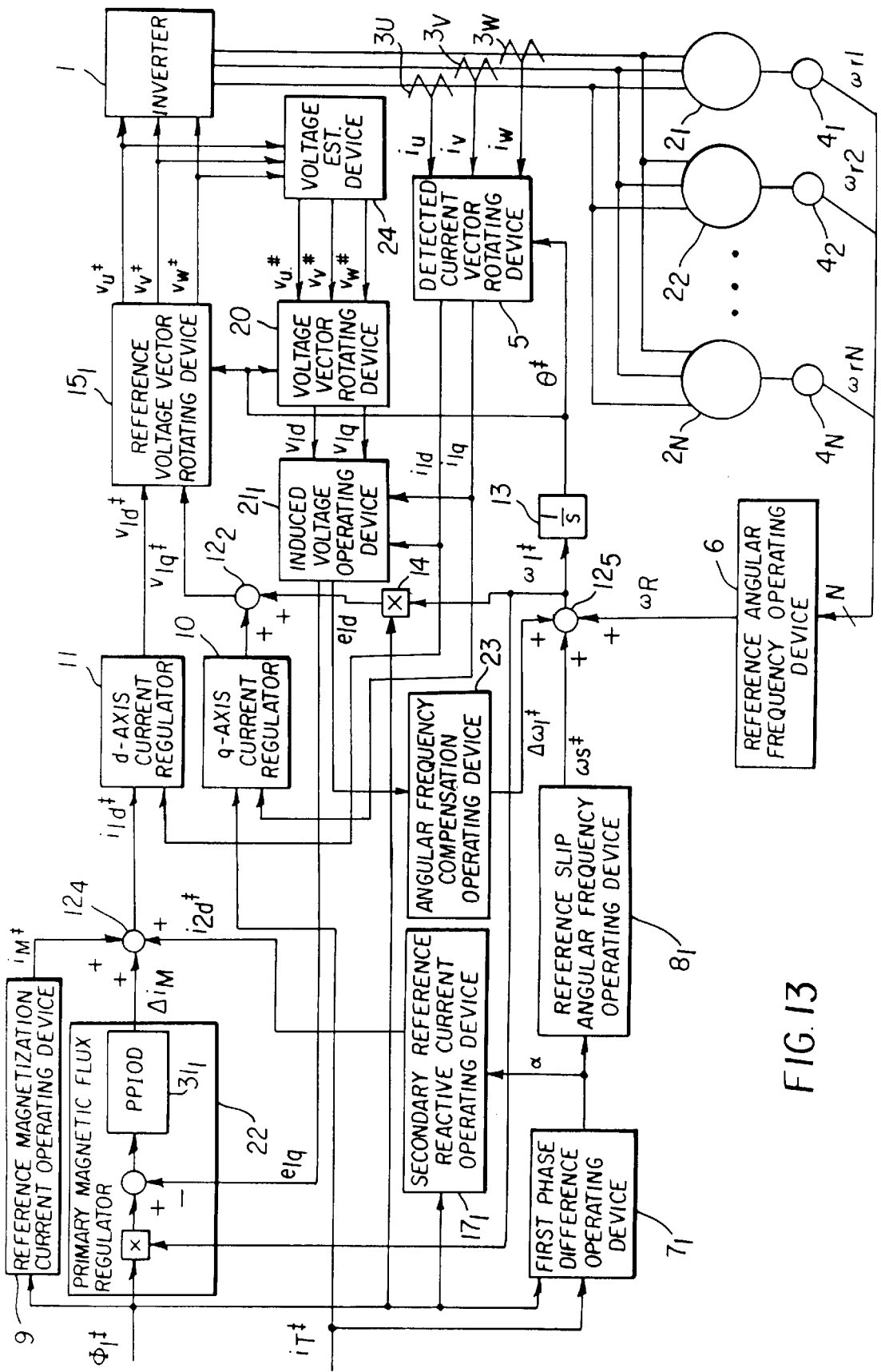
FIG. 13 is a block diagram of a thirteenth embodiment of a variable speed driving apparatus for driving a plurality of induction machines according to the present invention.

FIG. 13 is a block diagram of a thirteenth embodiment of a variable speed driving apparatus for driving a plurality of induction machines according to the present invention.

The variable speed driving apparatus of FIG. 13 includes an angular frequency compensation operating device 23 shown in FIG. 12 in addition to the constituent elements of the variable speed driving apparatus of FIG. 10. The result of the operation in the angular frequency compensation operating device 23 is added to the primary reference angular frequency $\omega_1^*$ in an adder $12_5$. The other basic operations of the variable speed driving apparatus of FIG. 13 are same with those of the variable speed driving apparatus of FIG. 10.

Thus, the variable speed driving apparatus of FIG. 13 facilitates converging the d-axis component of the induced voltage $e_{1d}$ to zero and, as a result, reducing the deviations of the directions of the primary magnetic flux vectors from the direction of the primary reference magnetic flux vector.

The angular frequency compensation operating device 23 can be added to either one of the configurations of FIGS. 1 through 6.

Figure 14:
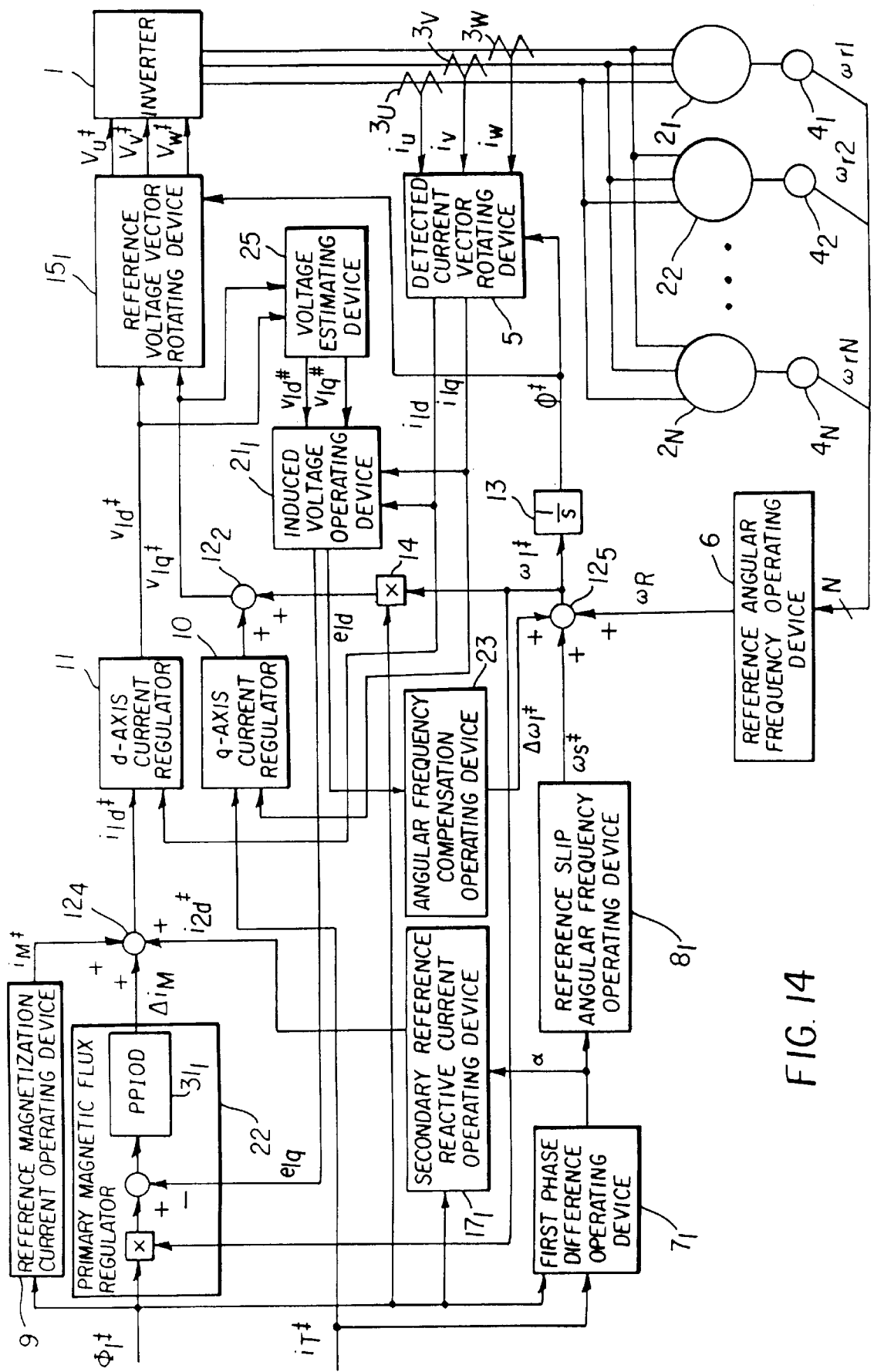
FIG. 14 is a block diagram of a fourteenth embodiment of a variable speed driving apparatus for driving a plurality of induction machines according to the present invention.

FIG. 14 is a block diagram of a fourteenth embodiment of a variable speed driving apparatus for driving a plurality of induction machines according to the present invention.

The variable speed driving apparatus of FIG. 14 includes an angular frequency compensation operating device 23 shown in FIG. 12 in addition to the constituent elements of the variable speed driving apparatus of FIG. 11. The result of the operation in the angular frequency compensation operating device 23 is added to the primary reference angular frequency $\omega_1^*$ in an adder $12_5$. The other basic operations of the variable speed driving apparatus of FIG. 13 are same with those of the variable speed driving apparatus of FIG. 11.

Thus, the variable speed driving apparatus of FIG. 14 facilitates converging the d-axis component of the induced voltage $e_{1d}$ to zero and, as a result, reducing the deviations of the directions of the primary magnetic flux vectors from the direction of the primary reference magnetic flux vector.

The angular frequency compensation operating device 23 can be added to either one of the configurations of FIGS. 1 through 6.

Figure 15:
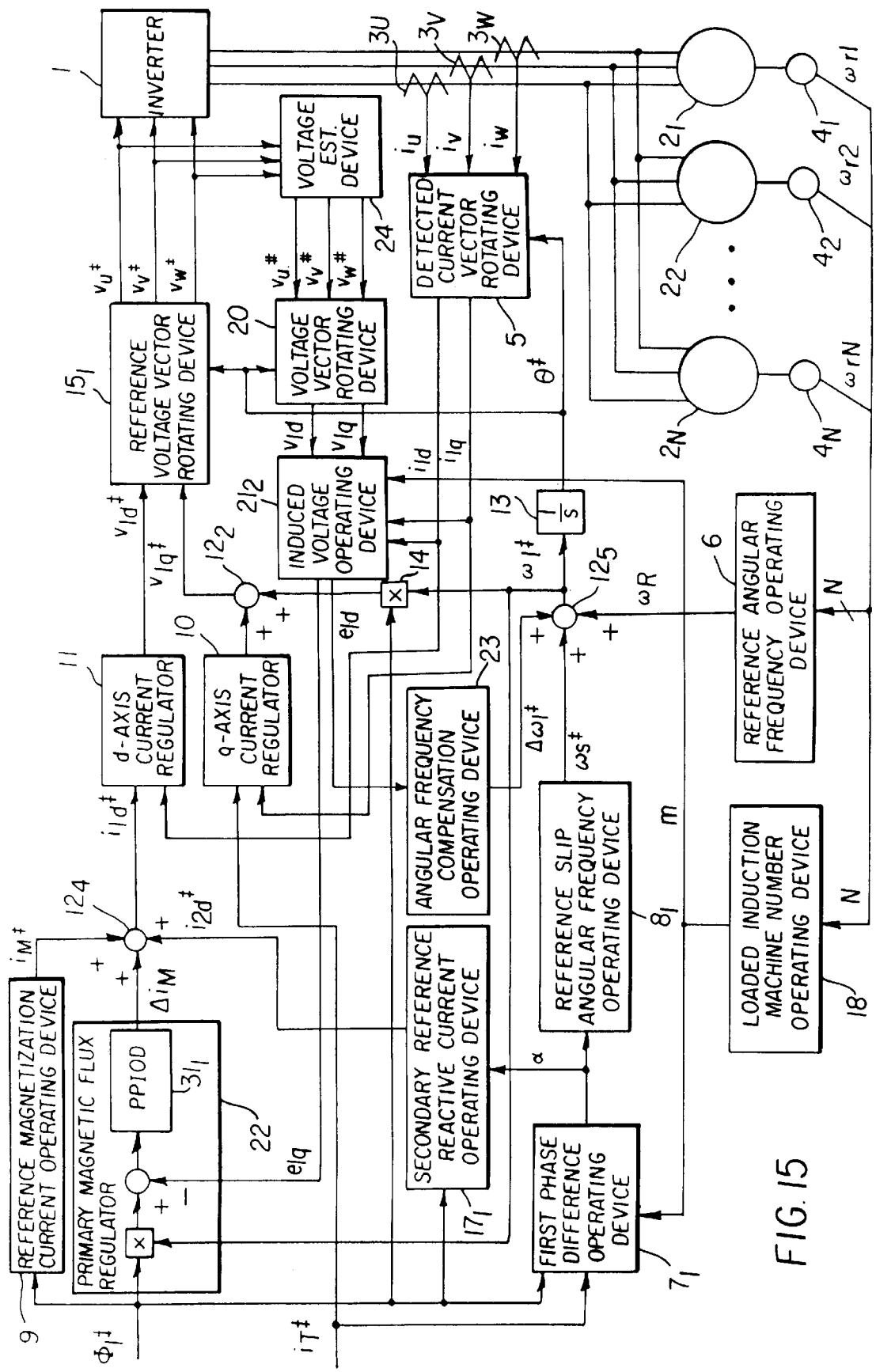
FIG. 15 is a block diagram of an fifteenth embodiment of a variable speed driving apparatus for driving a plurality of induction machines according to the present invention.

FIG. 15 is a block diagram of a fifteenth embodiment of a variable speed driving apparatus for driving a plurality of induction machines according to the present invention.

The variable speed driving apparatus of FIG. 15 includes a loaded induction machine number operating device 18 shown in FIG. 5 for calculating the number m of the induction machines bearing respective loads in addition to the constituent elements of the variable speed driving apparatus of FIG. 13. The number m of the loaded induction machines is inputted to an induced voltage operating device $21_2$.

The induced voltage operating device $21_2$ operates the q-axis component of the induced voltage $e_{1q}$ according to equation 34.

Thus, the variable speed driving apparatus of FIG. 15 improves the operation accuracy of the q-axis component of the induced voltage $e_{1q}$ of the induction machine bearing a load.

The loaded induction machine number operating device 18 can be added to either one of the configurations of FIGS. 9 through 14.

Figure 16:
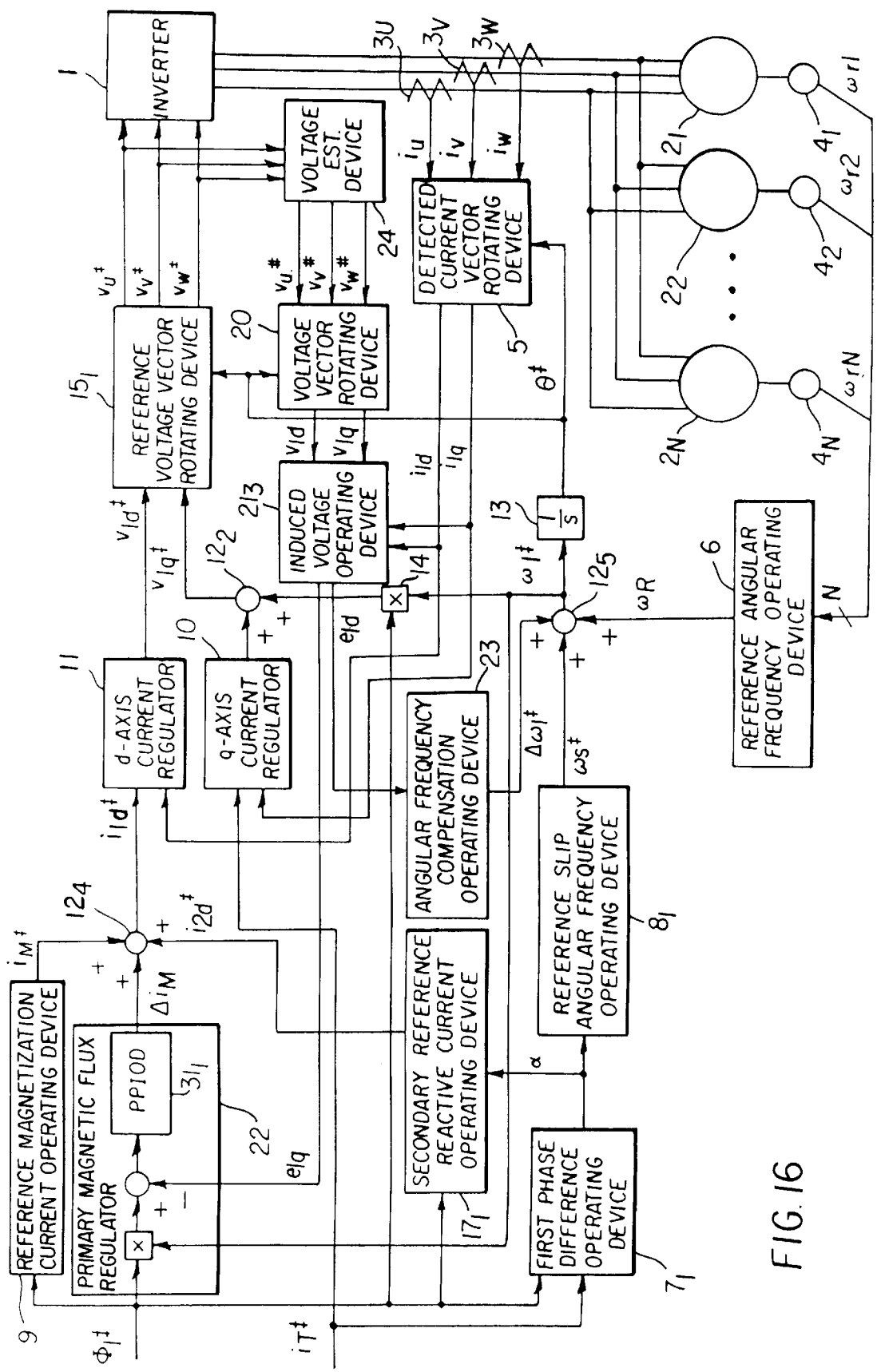
FIG. 16 is a block diagram of a sixteenth embodiment of a variable speed driving apparatus for driving a plurality of induction machines according to the present invention.
Figure 17:
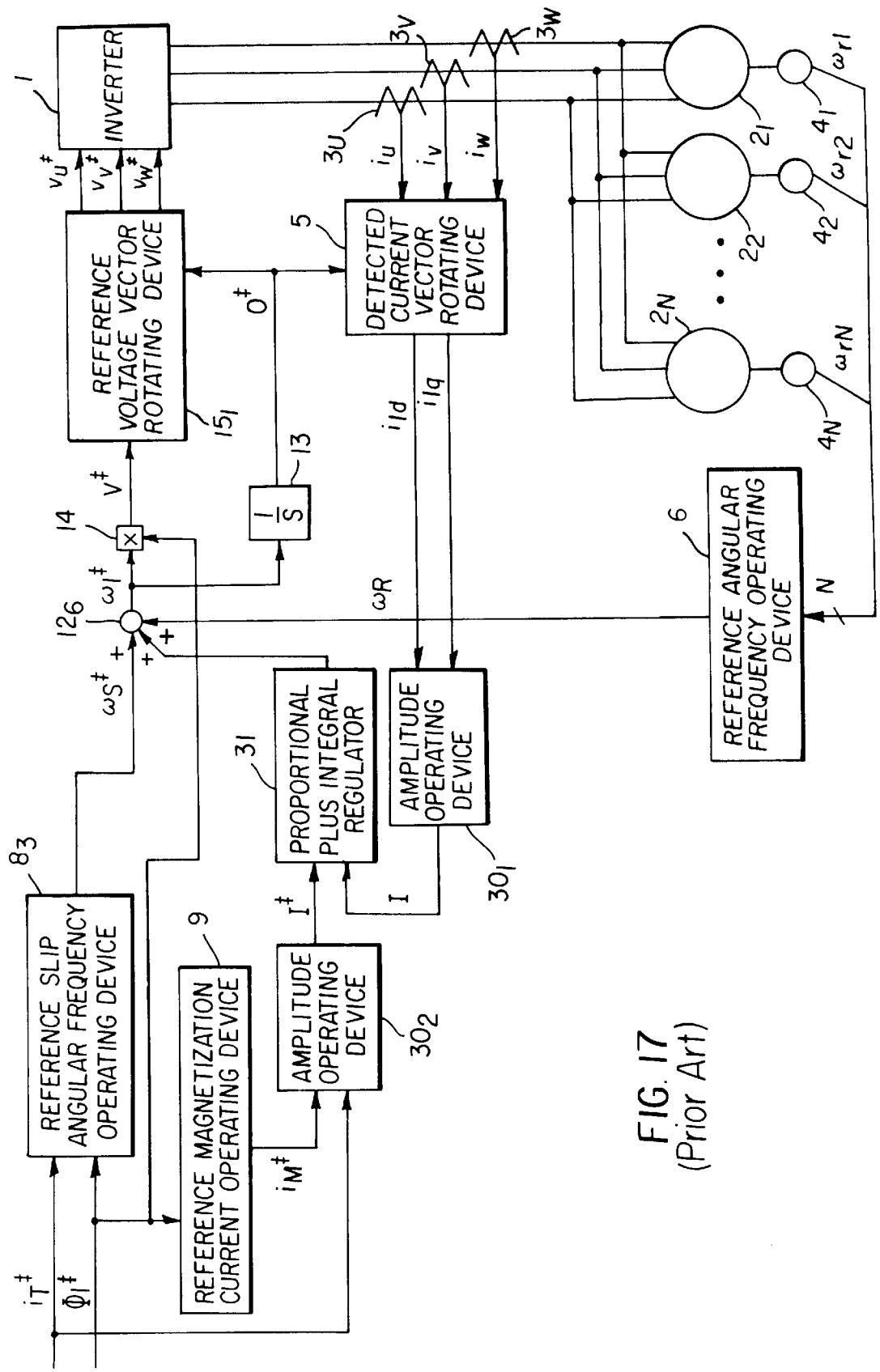
FIG. 17 is a block diagram of a typical variable speed driving apparatus according to the prior art for driving a plurality of induction machines.

FIG. 16 is a block diagram of a sixteenth embodiment of a variable speed driving apparatus for driving a plurality of induction machines according to the present invention.

The variable speed driving apparatus of FIG. 16 employs a proportional plus integral operating device for the q-axis current regulator 10 of FIG. 13 and feeds the integral term of the proportional plus integral operation to an induced voltage operating device $21_3$.

The q-axis current regulator 10 executes proportional plus integral operation according to equation 35. The induced voltage operating device $21_3$ operates the q-axis component of the induced voltage $e_{1q}$ according to equation 36.

Thus, the variable speed driving apparatus of FIG. 16 improves the operation accuracy of the q-axis component of the induced voltage $e_{1q}$ of the induction machine bearing a load.

As explained above, the variable speed driving apparatus of the invention facilitates reducing the deviations of the directions and magnitudes of the primary magnetic flux vectors from the direction and magnitude of the reference primary magnetic flux vector and, as a result, facilitates preventing the torque and rotating speed of the induction machines bearing respective loads from lowering even in the low speed range.

The means for calculating the number of the induction machines bearing respective loads facilitates preventing the torque and rotating speed of the induction machines even when the loads on the respective induction machines are unbalanced with one another.

What is claimed is:

1. A variable speed driving apparatus comprising:
   an inverter;
   a set of current detectors for outputting detected current values;
   a plurality of induction machines connected to said inverter;
   a plurality of speed detectors, each coupled to each of said induction machines;
   a reference angular frequency operating means for operating the rotating angular frequency of one of said induction machines bearing the heaviest load based on the output signals from said speed detectors;
   a first phase difference operating means for operating the first phase difference between the secondary side component of a reference current and a primary reference magnetic flux;
   a first reference slip angular frequency operating means, thereto said first phase difference is inputted;
   a first adder for adding the output of said first reference slip angular frequency operating means and the output of said reference angular frequency operating means and for outputting a primary reference angular frequency;
   an integrator for integrating said primary reference angular frequency;
   a detected current vector rotating means for converting said detected current values to a q-axis component perpendicular to said primary reference magnetic flux and a d-axis component parallel to said primary reference magnetic flux based on the output of said integrator;
   a d-axis current regulating means, thereto a d-axis component of said reference current value and said d-axis component of said detected current values are inputted;
   a q-axis current regulating means, thereto a q-axis component of said reference current value and said q-axis component of said detected current values are inputted; and
   a reference voltage vector rotating means for converting a d-axis reference voltage value and a q-axis reference voltage value to reference three-phase voltage values based on said output of said integrator.

2. A variable speed driving apparatus comprising:
   an inverter;
   a set of current detectors for outputting detected current values;
   a plurality of induction machines connected to said inverter;
   a plurality of speed detectors, each coupled to each of said induction machines;
   a reference angular frequency operating means for operating the rotating angular frequency of one of said induction machines bearing the heaviest load based on the output signals from said speed detectors;
   a phase difference operating means for operating the second phase difference between the secondary side component of a reference current and a reference induced voltage value;
   a reference slip angular frequency operating means, thereto said second phase difference is inputted;
   a first adder for adding the output of said reference slip angular frequency operating means and the output of said reference angular frequency operating means and for outputting a primary reference angular frequency;
   an integrator for integrating said primary reference angular frequency;
   a detected current vector rotating means for converting said detected current values to a q-axis component perpendicular to said primary reference magnetic flux and a d-axis component parallel to said primary reference magnetic flux based on the output of said integrator;
   a d-axis current regulating means, thereto a d-axis component of said reference current value and said d-axis component of said detected current values are inputted;
   a q-axis current regulating means, thereto a q-axis component of said reference current value and said q-axis component of said detected current values are inputted; and
   a reference voltage vector rotating means for converting a d-axis reference voltage value and a q-axis reference voltage value to reference three-phase voltage values based on said output of said integrator.

3. The variable speed driving apparatus according to claim 1, further comprising:
   a first secondary reference reactive current operating means, thereto said first phase difference between said secondary side component of said reference current and said primary reference magnetic flux and a reference torque current value are inputted; and
   a second adder for adding the output of said first secondary reference reactive current operating means and said d-axis reference current value.

4. The variable speed driving apparatus according to claim 2, further comprising a secondary reference reactive current operating means, thereto said second phase difference between said secondary side component of said reference current and said reference induced voltage value and a reference torque current value are inputted; and
   a second adder for adding the output of said second secondary reference reactive current operating means and said d-axis reference current value.

5. The variable speed driving apparatus according to claim 1, further comprising a loaded induction machine number operating means for calculating the number of said induction machines bearing respective loads based on the outputs of said speed detectors and for outputting said calculated number of said induction machines to said first phase difference operating means.

6. The variable speed driving apparatus according to claim 2, further comprising a loaded induction machine number operating means for calculating the number of said induction machines bearing respective loads based on the outputs of said speed detectors and for outputting said calculated number of said induction machines to said phase difference operating means.

7. The variable speed driving apparatus according to claim 1, further comprising:
   a set of voltage detectors for detecting the alternating voltages of said inverter and for outputting detected voltage values;
   a voltage vector rotating means for converting said detected voltage values to a d-axis component and a q-axis component;
   an induced voltage operating means, thereto the output of said voltage vector rotating means and the output of said detected current vector rotating means are inputted;
   a primary magnetic flux regulating means, thereto the output of said induced voltage operating means, said primary reference magnetic flux and said primary reference angular frequency are inputted; and
   a third adder for adding the output of said primary magnetic flux regulating means to said reference d-axis current component.

8. The variable speed driving apparatus according to claim 2, further comprising:
   a set of voltage detectors for detecting the alternating voltages of said inverter and for outputting detected voltage values;
   a voltage vector rotating means for converting said detected voltage values to a d-axis component and a q-axis component;
   an induced voltage operating means, thereto the output of said voltage vector rotating means and the output of said detected current vector rotating means are inputted;
   a primary magnetic flux regulating means, thereto the output of said induced voltage operating means, said primary reference magnetic flux and said primary reference angular frequency are inputted; and
   a third adder for adding the output of said primary magnetic flux regulating means to said reference d-axis current component.

9. The variable speed driving apparatus according to claim 1, further comprising:
   a first voltage estimating means, thereto said reference three-phase voltage values are inputted, for outputting estimated three-phase voltage values;
   a voltage vector rotating means for converting said estimated three-phase voltage values to a q-axis component and a d-axis component;
   an induced voltage operating means, thereto the output of said voltage vector rotating means and the output of said detected current vector rotating means are inputted;
   a primary magnetic flux regulating means, thereto the output of said induced voltage operating means, said primary reference magnetic flux and said primary reference angular frequency are inputted; and
   a third adder for adding the output of said primary magnetic flux regulating means to said reference d-axis current component.

10. The variable speed driving apparatus according to claim 2, further comprising:
    a first voltage estimating means, thereto said reference three-phase voltage values are inputted, for outputting estimated three-phase voltage values;
    a voltage vector rotating means for converting said estimated three-phase voltage values to a q-axis component and a d-axis component;
    an induced voltage operating means, thereto the output of said voltage vector rotating means and the output of said detected current vector rotating means are inputted;
    a primary magnetic flux regulating means, thereto the output of said induced voltage operating means, said primary reference magnetic flux and said primary reference angular frequency are inputted; and
    a third adder for adding the output of said primary magnetic flux regulating means to said reference d-axis current component.

11. The variable speed driving apparatus according to claim 1, further comprising:
    a second voltage estimating means, thereto said reference d-axis voltage value and said reference q-axis voltage value are inputted, for outputting estimated two-phase voltage values;
    an induced voltage operating means, thereto the output of said detected current vector rotating means and said estimated two-phase voltage values are inputted;
    a primary magnetic flux regulating means, thereto the output of said induced voltage operating means, said primary reference magnetic flux and said primary reference angular frequency are inputted; and
    a third adder for adding the output of said primary magnetic flux regulating means to said reference d-axis current component.

12. The variable speed driving apparatus according to claim 2, further comprising:
    a second voltage estimating means, thereto said reference d-axis voltage value and said reference q-axis voltage value are inputted, for outputting estimated two-phase voltage values;

an induced voltage operating means, thereto the output of said detected current vector rotating means and said estimated two-phase voltage values are inputted;

a primary magnetic flux regulating means, thereto the output of said induced voltage operating means, said primary reference magnetic flux and said primary reference angular frequency are inputted; and a third adder for adding the output of said primary magnetic flux regulating means to said reference d-axis current component.

13. The variable speed driving apparatus according to claim 1, further comprising:

a set of voltage detectors for detecting the alternating voltages of said inverter and for outputting detected voltage values;

a voltage vector rotating means for converting said detected voltage values to a d-axis component and a q-axis component;

an induced voltage operating means, thereto the output of said voltage vector rotating means and the output of said detected current vector rotating means are inputted; and an angular frequency compensation operating means for operating the compensation value of said primary reference angular frequency corresponding to a d-axis voltage component of an induced voltage.

14. The variable speed driving apparatus according to claim 2, further comprising:

a set of voltage detectors for detecting the alternating voltages of said inverter and for outputting detected voltage values;

a voltage vector rotating means for converting said detected voltage values to a d-axis component and a q-axis component;

an induced voltage operating means, thereto the output of said voltage vector rotating means and the output of said detected current vector rotating means are inputted; and an angular frequency compensation operating means for operating the compensation value of said primary reference angular frequency corresponding to a d-axis voltage component of an induced voltage.

15. The variable speed driving apparatus according to claim 1, further comprising:

a first voltage estimating means, thereto said reference three-phase voltage values are inputted, for outputting estimated three-phase voltage values;

a voltage vector rotating means for converting said estimated three-phase voltage values to a q-axis component and a d-axis component;

an induced voltage operating means, thereto the output of said voltage vector rotating means and the output of said detected current vector rotating means are inputted; and an angular frequency compensation operating means for operating the compensation value of said primary reference angular frequency corresponding to a d-axis voltage component of an induced voltage.

16. The variable speed driving apparatus according to claim 2, further comprising:

a first voltage estimating means, thereto said reference three-phase voltage values are inputted, for outputting estimated three-phase voltage values;

a voltage vector rotating means for converting said estimated three-phase voltage values to a q-axis component and a d-axis component;

an induced voltage operating means, thereto the output of said voltage vector rotating means and the output of said detected current vector rotating means are inputted; and an angular frequency compensation operating means for operating the compensation value of said primary reference angular frequency corresponding to a d-axis voltage component of an induced voltage.

17. The variable speed driving apparatus according to claim 1, further comprising:

a second voltage estimating means, thereto said reference d-axis voltage value and said reference q-axis voltage value are inputted, for outputting estimated two-phase voltage values;

an induced voltage operating means, thereto the output of said detected current vector rotating means and said estimated two-phase voltage values are inputted; and an angular frequency compensation operating means for operating the compensation value of said primary reference angular frequency corresponding to a d-axis voltage component of an induced voltage.

18. The variable speed driving apparatus according to claim 2, further comprising:

a second voltage estimating means, thereto said reference d-axis voltage value and said reference q-axis voltage value are inputted, for outputting estimated two-phase voltage values;

an induced voltage operating means, thereto the output of said detected current vector rotating means and said estimated two-phase voltage values are inputted; and an angular frequency compensation operating means for operating the compensation value of said primary reference angular frequency corresponding to a d-axis voltage component of an induced voltage.

19. The variable speed driving apparatus according to claim 7, further comprising:

a loaded induction machine number operating means for calculating the number of said induction machines bearing respective loads based on the outputs of said speed detectors and for outputting said calculated number of said induction machines to said induced voltage operating means.

20. The variable speed driving apparatus according to claim 8, further comprising:

a loaded induction machine number operating means for calculating the number of said induction machines bearing respective loads based on the outputs of said speed detectors and for outputting said calculated number of said induction machines to said induced voltage operating means.

21. The variable speed driving apparatus according to claim 9, further comprising:

a loaded induction machine number operating means for calculating the number of said induction machines bearing respective loads based on the outputs of said speed detectors and for outputting said calculated number of said induction machines to said induced voltage operating means.

22. The variable speed driving apparatus according to claim 10, further comprising:

a loaded induction machine number operating means for calculating the number of said induction machines bearing respective loads based on the outputs of said speed detectors and for outputting said calculated number of said induction machines to said induced voltage operating means.

23. The variable speed driving apparatus according to claim 11, further comprising:

a loaded induction machine number operating means for calculating the number of said induction machines bearing respective loads based on the outputs of said speed detectors and for outputting said calculated number of said induction machines to said induced voltage operating means.

24. The variable speed driving apparatus according to claim 12, further comprising:

a loaded induction machine number operating means for calculating the number of said induction machines bearing respective loads based on the outputs of said speed detectors and for outputting said calculated number of said induction machines to said induced voltage operating means.

25. The variable speed driving apparatus according to claim 13, further comprising:

a loaded induction machine number operating means for calculating the number of said induction machines bearing respective loads based on the outputs of said speed detectors and for outputting said calculated number of said induction machines to said induced voltage operating means.

26. The variable speed driving apparatus according to claim 14, further comprising:

a loaded induction machine number operating means for calculating the number of said induction machines bearing respective loads based on the outputs of said speed detectors and for outputting said calculated number of said induction machines to said induced voltage operating means.

27. The variable speed driving apparatus according to claim 15, further comprising:

a loaded induction machine number operating means for calculating the number of said induction machines bearing respective loads based on the outputs of said speed detectors and for outputting said calculated number of said induction machines to said induced voltage operating means.

28. The variable speed driving apparatus according to claim 16, further comprising:

a loaded induction machine number operating means for calculating the number of said induction machines bearing respective loads based on the outputs of said speed detectors and for outputting said calculated number of said induction machines to said induced voltage operating means.

29. The variable speed driving apparatus according to claim 17, further comprising:

a loaded induction machine number operating means for calculating the number of said induction machines bearing respective loads based on the outputs of said speed detectors and for outputting said calculated number of said induction machines to said induced voltage operating means.

30. The variable speed driving apparatus according to claim 18, further comprising:

a loaded induction machine number operating means for calculating the number of said induction machines bearing respective loads based on the outputs of said speed detectors and for outputting said calculated number of said induction machines to said induced voltage operating means.

31. The variable speed driving apparatus according to claim 7, further comprising a q-axis current regulating means comprising a proportional plus integral operating device, the integral term therefrom being inputted to said induced voltage operating means.

32. The variable speed driving apparatus according to claim 8, further comprising a q-axis current regulating means comprising a proportional plus integral operating device, the integral term therefrom being inputted to said induced voltage operating means.

33. The variable speed driving apparatus according to claim 9, further comprising a q-axis current regulating means comprising a proportional plus integral operating device, the integral term therefrom being inputted to said induced voltage operating means.

34. The variable speed driving apparatus according to claim 10, further comprising a q-axis current regulating means comprising a proportional plus integral operating device, the integral term therefrom being inputted to said induced voltage operating means.

35. The variable speed driving apparatus according to claim 11, further comprising a q-axis current regulating means comprising a proportional plus integral operating device, the integral term therefrom being inputted to said induced voltage operating means.

36. The variable speed driving apparatus according to claim 12, further comprising a q-axis current regulating means comprising a proportional plus integral operating device, the integral term therefrom being inputted to said induced voltage operating means.

37. The variable speed driving apparatus according to claim 13, further comprising a q-axis current regulating means comprising a proportional plus integral operating device, the integral term therefrom being inputted to said induced voltage operating means.

38. The variable speed driving apparatus according to claim 14, further comprising a q-axis current regulating means comprising a proportional plus integral operating device, the integral term therefrom being inputted to said induced voltage operating means.

39. The variable speed driving apparatus according to claim 15, further comprising a q-axis current regulating means comprising a proportional plus integral operating device, the integral term therefrom being inputted to said induced voltage operating means.

40. The variable speed driving apparatus according to claim 16, further comprising a q-axis current regulating means comprising a proportional plus integral operating device, the integral term therefrom being inputted to said induced voltage operating means.

41. The variable speed driving apparatus according to claim 17, further comprising a q-axis current regulating means comprising a proportional plus integral operating device, the integral term therefrom being inputted to said induced voltage operating means.

42. The variable speed driving apparatus according to claim 18, further comprising a q-axis current regulating means comprising a proportional plus integral operating device, the integral term therefrom being inputted to said induced voltage operating means.

* * * * *